US011671323B1

(12) United States Patent
Porat et al.

(10) Patent No.: US 11,671,323 B1
(45) Date of Patent: Jun. 6, 2023

(54) PREPLAN ASSIGNMENT GENERATION

(71) Applicant: ECI Telecom Ltd., Petah Tikva (IL)

(72) Inventors: Hayim Porat, Rishon LeTsyion (IL); Shirel Ezra, Ganei Tal (IL); Efraim Gelman, Ramat Gan (IL)

(73) Assignee: ECI Telecom Ltd., Petah Tikva (IL)

( * ) Notice: Subject to any disclaimer, the term of this patent is extended or adjusted under 35 U.S.C. 154(b) by 0 days.

(21) Appl. No.: 17/970,475

(22) Filed: Oct. 20, 2022

(51) Int. Cl.
*G06F 15/177* (2006.01)
*H04L 41/084* (2022.01)
*H04L 41/12* (2022.01)

(52) U.S. Cl.
CPC ............ *H04L 41/084* (2013.01); *H04L 41/12* (2013.01)

(58) Field of Classification Search
CPC .............................. H04L 41/12; H04L 41/145
USPC ......................................................... 709/220
See application file for complete search history.

(56) References Cited

U.S. PATENT DOCUMENTS

| 10,841,003 | B1 * | 11/2020 | Ezra | H04L 45/16 |
| 11,108,873 | B1 * | 8/2021 | Ezra | H04L 45/302 |
| 11,552,723 | B2 * | 1/2023 | Bathula | H04Q 11/0062 |
| 2005/0195739 | A1 * | 9/2005 | Grover | H04L 41/0663 370/225 |
| 2011/0051726 | A1 * | 3/2011 | Bejerano | H04L 12/1877 370/390 |
| 2016/0087849 | A1 * | 3/2016 | Balasubramanian | H04L 41/0813 709/221 |
| 2017/0063666 | A1 * | 3/2017 | Ahuja | H04L 45/121 |
| 2017/0373943 | A1 * | 12/2017 | Goel | H04L 41/12 |
| 2021/0160174 | A1 * | 5/2021 | Kashyap | H04L 45/22 |

* cited by examiner

*Primary Examiner* — Hee Soo Kim
(74) *Attorney, Agent, or Firm* — Finnegan, Henderson, Farabow, Garrett & Dunner, LLP

(57) ABSTRACT

Configuration of a communication network can include obtaining a graph representing the communication network, generation of a the preplan assignment for the communication network, and configuration of the communication network according to the preplan assignment. The graph can be associated with shared risk link groups (SRLGs) and demands. Generation of the preplan assignment can include obtaining a headend assignment between each one of the demands and a headend vertex on the graph. Generation of the preplan assignment can further include obtaining a SRLG-distinguishing assignment between each headend and a corresponding reporting edge set. The reporting edge set for a headend can include sufficient edges to distinguish among SRLGs affecting the headend. Generation of the preplan assignment can further include obtaining a notification path assignment between each headend and each reporting edge in the corresponding reporting edge set for the headend.

22 Claims, 10 Drawing Sheets

PREPLAN ASSIGNMENT GENERATION

TECHNICAL FIELD

The present disclosure relates to the field of communication networks and, more particularly, to systems and methods for routing in communication networks.

BACKGROUND

A communication network can include nodes connected by communication links. Demands on the communication network can flow from source nodes to target nodes along routes that include one or more of the communication links. Multiple paths can connect a source node to a target node. When a communication link on a path of a demand fails, the demand can be re-routed along another path from the starting node to the finishing node.

Communication link failures may not be uncorrelated, however. A group of communication links, referred to as a Shared Risk Link Group (or SRLG), can be subject to a common risk. Such groups can arise from the physical architecture of the network. For example, multiple optical fibers may be bundled into a single conduit. An event that severs one optical fiber in that conduit will likely sever all optical fibers in that conduit.

Multiple SRLGs can be associated with a single communication link. A failure of any one of these multiple SRLGs can cause the communication link to fail. But the failure of a single communication link may not provide sufficient information to identify which of the multiple SRLGs failed. And knowing which of the multiple SRLGs failed can be important in re-routing the demand through the network.

Conventional techniques for monitoring the state of a communication network may not support rapid and resilient recovery from SRLG failures. Improved monitoring techniques may enable improved identification of SRLG failures and improved network recovery from SRLG failures.

SUMMARY

Systems and methods are disclosed for configuring a communication network. A preplan assignment can be generated for the communication network. The preplan assignment can specify the headends for each demand on the communication network, the sets of reporting edges for each headend, and the notification paths that connect endpoints of reporting edges with the headends to which the endpoints report.

The disclosed embodiments include a method for configuring a communication network. The method can include an operation of obtaining a graph representing a communication network. The graph can include vertices corresponding to nodes in the communication network and edges corresponding to communication channels in the communication network. The graph can be associated with SRLGs. Each edge can be associated with at least one of the SRLGs. The graph can be associated with demands. Each one of the demands can specify a source vertex and a target vertex. The method can include an operation of generating a preplan assignment. Such generation can include obtaining a headend assignment between each one of the demands and a headend. The headend can be one of the source vertex or the target vertex for the one of the demands. Such generation can further include obtaining a SRLG-distinguishing assignment between each one of the headends and a corresponding reporting edge set. The corresponding reporting edge set can be sufficient to distinguish among SRLGs affecting the one of the headends. The method can include an operation of providing instructions to configure the communication network according to the preplan assignment.

The disclosed embodiments further include systems configured to perform the disclosed methods, and non-transitory, computer-readable media containing instructions for performing the disclosed methods.

The foregoing general description and the following detailed description are exemplary and explanatory only and are not restrictive of the claims.

BRIEF DESCRIPTION OF THE DRAWINGS

The accompanying drawings, which are incorporated in and constitute part of this disclosure, together with the description, illustrate and serve to explain the principles of various example embodiments.

DETAILED DESCRIPTION

Figure 1:
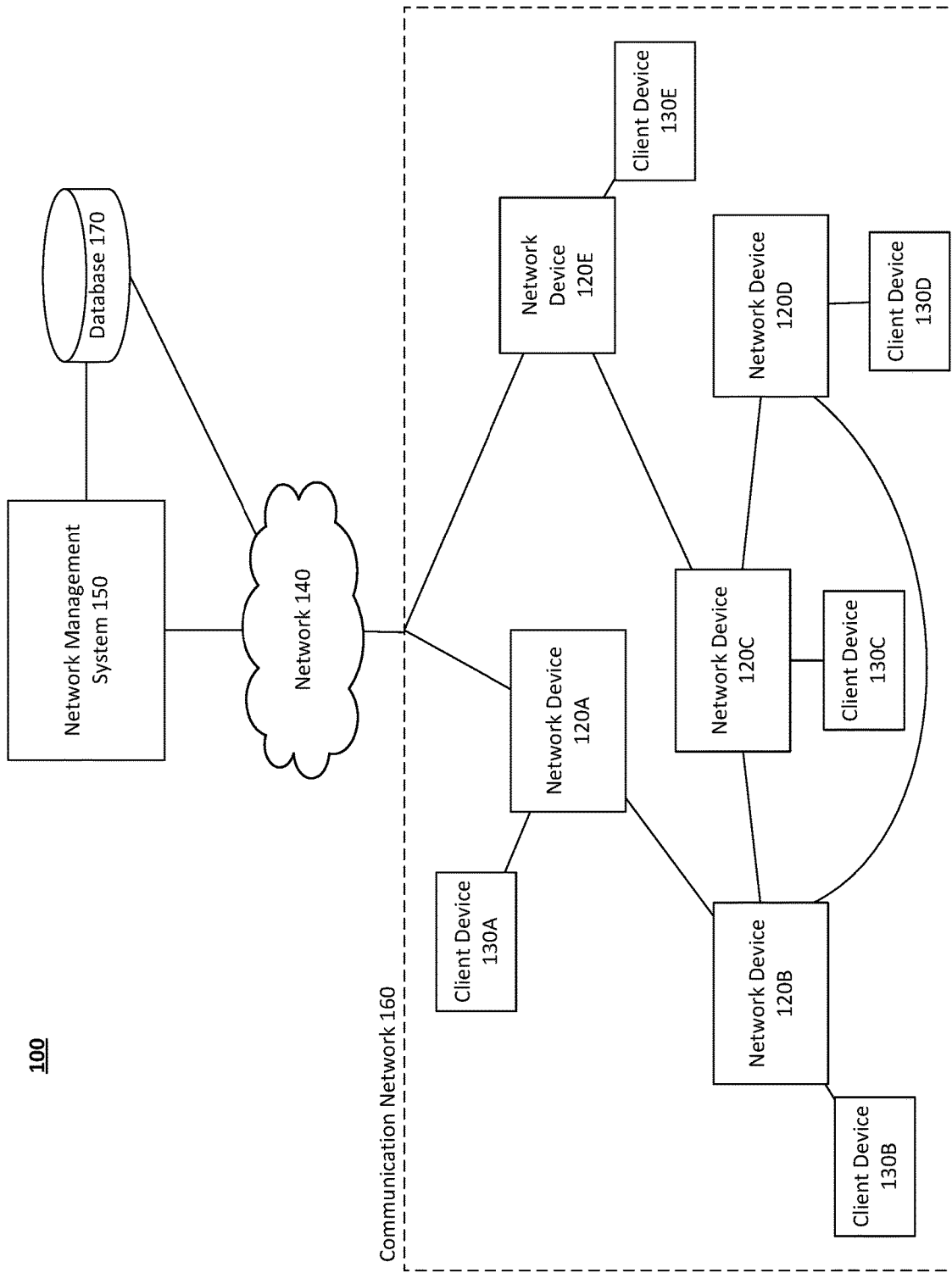
FIG. 1 depicts an exemplary data communication network in which various implementations as described herein may be practiced.

The following detailed description refers to the accompanying drawings. Wherever possible, the same reference numbers are used in the drawings and the following description to refer to the same or similar parts. While several illustrative embodiments are described herein, modifications, adaptations, and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

A communication network can include network nodes (e.g., clients, servers, microservices, virtual machines, serverless code instances, IoT devices, etc.) configured to communicate with one another using communication links. The disclosed embodiments are not limited to any particular communication link implementation or physical medium. The communication links can include wired or wireless communication links. Wired communication links can include, for instance, optical links, electrical communication links, or other suitable links. Wireless communication links can include, as examples, microwave, radio wave, optical links, or other suitable wireless links. Communications between network nodes can be implemented using communications protocols. The disclosed embodiments are not limited to any particular communication protocol. Communication protocols can include cellular communication protocols (e.g., 3G, 4G, 5G, or the like), IEEE 802 or IEEE 802-based protocols (e.g., Ethernet, WiFi, Zigbee or the like), digital subscriber line (DSL), plain old telephone service (POTS), or other suitable protocols.

A communication network can be configured to satisfy demands. As used herein, a demand can be a request to communicate (or establish a communication channel, or the like) between a source node and a target node in the network. In some embodiments, a demand can specify a source node and a target node. In various embodiments, one or more of the source node and target node can be implicit or determined by the communication network in response to the demand.

The communication network can satisfy the demands using one or more routes provided through the communication network. Each route can be implemented using hardware (e.g., transceivers, or the like) or software resources (e.g., compute, memory, or the like) of the communication network. Consistent with disclosed embodiments, each route can include one or more service links (e.g., light paths between two nodes in an optical network through which light passes unmodified, or the like). Multiple potential routes can exist between a source node and target node on the communication network. When a communication link used to service a demand fails, the demand can be re-routed along another route from the source node to the target node.

Correlated communication link failures can complicate attempts to re-route a demand. A suitable recovery route for the demand may need to connect the source and target nodes, while avoiding the original failed communication link and other communication links that failed together with the original communication link. When a communication link fails due to the failure of an SRLG including that communication link, the recovery route should exclude communications links in that SRLG. However, identifying the failed SRLG can be technically challenging, as a single communication link may be included in multiple SRLGs.

A headend can be a node responsible for managing a demand on the communication network. The headend can provide instructions to other nodes, configuring these nodes to provide a route through the communication network for the demand. The disclosed embodiments are not limited to any particular implementation of such configuration. In some embodiments, the instructions can configure a target node with a forwarding entry associated with the demand. In some embodiments, the instructions can configure intermediate nodes along the route with forwarding entries associated with the demand. In some embodiments, the instructions can configure the intermediate and destination nodes to reserve communication capacity (e.g., bandwidth, or the like) for servicing the demand. The disclosed embodiments are not limited to any particular implementation of such communication capacity reservation. In some dense wavelength-division multiplexing (DWDM) embodiments, for example, reserved communication capacity can be specified in terms of spectrum and central frequency.

Consistent with disclosed embodiments, the headend can be configured, as part of a preplan assignment for the network, with a main route for the demand and backup routes for the demand. In some embodiments, one or more SRLGs can be associated with each backup route. Given a failure of an SRLG, the headend can provide instructions to the appropriate nodes to implement the backup route associated with the failed SRLG.

With sufficient information about the state of the communication network, a headend of the demand in the communication network can determine which SRLG(s) have failed. The node can then provide instructions to re-route the demand through the network, avoiding failed (or potentially failed) communication links. However, existing techniques for monitoring a communication network may not support rapid or resilient recovery from SRLG failures.

Some existing techniques can be slow or require an impractical number of messages to convey the state of the communication network. For example, a communication network can use the Open Shortest Path First (OSPF) protocol to enable nodes in the network to converge on a common view of the network state. But this protocol can require transmission of a number of messages on the order of the square of the number of vertices in the communication network. Waiting until the nodes have converged on a common view of the network state can compromise the resilience of the communication network. Acting before the nodes have converged on a common view of the network state can result in data loss or unintended network operations.

Some existing techniques may provide unsuitably incomplete information about the state of the communication network. For example, a communication network can use the Resource Reservation Protocol—Traffic Engineering (RSVP-TE) to enable a headend to quickly learn when a communication link fails on a route managed by the headend. But the headend is not informed of other communication link failures than might indicate failure of an SRLG. Consequently, the headend may attempt to re-route the demand through other failed communication links in the same SRLG, potentially leading to data loss or unintended network operations.

The disclosed embodiments can be performed using a graph representing the communication network. The graph can include vertices corresponding to nodes in the communication network and edges corresponding to communication links in the communication network. Consistent with disclosed embodiments, a vertex or an edge can correspond to a sub-network of the communication network. For example, an edge can correspond to three links linearly connected by two nodes. As an additional example, a vertex can correspond to three connected nodes, each of these nodes connected by a link to at least one of the other two nodes. As used herein, a headend can refer to a node of the communication network or a vertex corresponding to such a node on a graph representing the network.

The disclosed embodiments can include generating preplan assignments for communication networks. In some embodiments, a preplan assignment can include instructions specifying alternate paths for use in the event of communication link failures (or SRLG failures). In some embodiments using DWDM, the alternate path can specify change(s) in the color, central frequency, or spectrum used to service the demand. The headend node of a demand can be configured with these alternate paths. In some embodiments, a preplan assignment can specify that certain transmission nodes notify certain headend nodes when certain communication links directly connected to the transmission node fail. In some embodiments, the preplan assignment can further specify the notification paths used for such notifications. In some embodiments, the preplan assignment can specify that a node is a headend node for a first demand, and a transmission node for a second demand. Such a node can be configured with alternative paths for the first demand and notification paths for the second demand.

Consistent with disclosed embodiments, a preplan assignment can be implemented using data or instructions stored in a memory or persistent storage of a node. The disclosed embodiments are not limited to any particular language, format, or data structure for implementing the preplan assignment. In some embodiments, a preplan assignment can be implemented using a flat table stored in a database of a node. In various embodiments, the preplan assignment can be implemented using XML or JSON.

Consistent with disclosed embodiments, a communication network can be configured according to a preplan assignment to respond (e.g., automatically or semi-automatically with some user input) to communication link failures. In some embodiments, generation of a preplan assignment can include at least one of obtaining an assignment between headends and demands, obtaining an assignment between the headends and reporting edges on the graph, and obtaining an assignment of notification paths to the reporting edges.

The disclosed embodiments can include generating a headend assignment between headends and demands. In some instances, this assignment can be obtained as part of generating a preplan assignment. The headend assignment can associate each demand with a headend. The association of headend with demand can be configured to distribute the burden of transmitting and processing communication link failure notifications. In some embodiments, the headend assignment can be generated according to a cost function. The cost function can favor associating multiple demands with a single headend. As described herein, such a configuration can improve the capacity, responsiveness, and resilience of the communication network.

The disclosed embodiments can include generating an SRLG-distinguishing assignment between headends and edges on the graph. The SRLG-distinguishing assignment can specify reporting edges corresponding to each headend. A failure of any one of these reporting edges can be reported to the affected headend. As described herein, a failure of an SRLG affecting the headend can cause a subset of these reporting edges to fail. The reporting edges can be selected such that the pattern of failed reporting edges is sufficient to identify the failed SRLG. The reporting edges can be further selected to satisfy a resilience condition. In some embodiments, the SRLG-distinguishing assignment can be generated according to a cost function. The cost function can favor reducing the number (or maximum number, or the like) of notification messages sent concerning an edge or received in connection with an SRLG failure by a headend. Reducing such notification messages can reduce the time or computational resources required to recover from an SRLG failure, thereby improving the capacity, responsiveness, and resilience of the communication network.

The disclosed embodiments can include generating a notification path assignment, consistent with disclosed embodiments. The notification path assignment can associate each combination of headend and reporting edge with a set of notification paths. These notification paths can enable notification of the headend of the failure of the reporting edge. Each notification path can originate at an endpoint of the reporting edge and terminate at the headend. The set of notification paths can be selected to ensure the existence of a notification path disjoint with any SRLG affecting the reporting edge. The set of notification paths can be further selected to reduce the number of notification paths. In some embodiments, the notification path assignment can be generated according to a cost function. The cost function can favor reducing the number (or maximum number, or the like) of notification messages sent by a node or received in connection with an SRLG failure by a headend. Reducing such notification messages can reduce the time or computational resources required to recover from an SRLG failure, thereby improving the capacity, responsiveness, and resilience of the communication network.

As may be appreciated, one or more components of a preplan assignment can be generated in accordance with disclosed embodiments. Alternatively or additionally, one or more components of a preplan assignment can be generated using other methods or obtained from a user or another system. For example, a headend assignment can be generated as disclosed herein. The SRLG-distinguishing assignment and notification path assignment can then be generated using other methods or obtained from a user or another system. As an additional example, the headend assignment can be generated using another method, or obtained from a user or another system. The SRLG-distinguishing assignment can then be generated as disclosed herein. The notification path assignment can then be generated using other methods or obtained from a user or another system. As a further example, the headend assignment and SRLG-distinguishing assignment can be generated using other methods or obtained from a user or another system. The notification path assignment can then be generated as disclosed herein.

FIG. 1 depicts an exemplary communication system 100, consistent with disclosed embodiments. Communication system 100 includes, for example, a network 140, network management system 150, database 170, network devices 120A-120E (collectively nodes 120), and client devices 130A-130E (collectively client devices 130). Nodes 120 and client devices 130 form a communication network 160, in which the nodes 120 provide communication services to client devices 130. The nodes can include hardware-based or software-based switches, routers, splitters, or the like that facilitate delivery of communication services to client devices 130. The components and arrangements shown in FIG. 1 are not intended to limit the disclosed embodiments, as the system components used to implement the disclosed embodiments can vary. For example, each of nodes 120 may be associated with zero or more client devices 130. In various embodiments, communication network 160 can be implemented using on-premises network environments, virtualized (cloud) network environments, or combinations of on-premises and cloud networks. Consistent with embodiments described herein, various types of data may be communicated over communication network 160, such as Internet (e.g., IP protocol) data, telephony or telecommunications data, satellite data, IoT-based data, cellular data, proprietary network data, or other suitable data.

Consistent with disclosed embodiments, some of nodes 120 can be configured to serve as headends for demands on communication network 160. Such nodes can provide decentralized routing management for demands on communication network 160. Consistent with disclosed embodiments, such routing management can include initialization, monitoring, or recovery services.

In some embodiments, the initialization can include providing initial setup message(s) to other component(s) (e.g., other ones of nodes 120, or the like) in communication network 160. These initial message(s) can configure component(s) on the main route of the demand to implement the main route. For example, such initial message(s) can configure these component(s) to reserve communications capacity (e.g., bandwidth) for servicing the demand. These initial message(s) can configure certain component(s) that are the endpoints of certain communication links, as described herein, to report a failure of such communication links to the headend using preplanned notification routes.

In some embodiments, the monitoring can include waiting for notification messages indicating communication link failures. The disclosed embodiments are not limited to any particular implementation of the notification messages. In some embodiments, a notification message can be implemented using a suitable protocol for reserving or managing resources in a network. The protocol can be a traffic engineering protocol, such as the Resource Reservation Protocol—Traffic Engineering (RSVP-TE) protocol, or another suitable protocol. In some embodiments, the notification message can be an augmented RSVP-TE message, such as a Path Error Resv Error message or a Notify message. Consistent with disclosed embodiments, the notification message can indicate the failed edge. Based on these notification messages, the node can determine a state (or partial state) of communication network 160 (e.g., whether an SRLG has failed, which SRLG has failed, or the like). The node can be configured with backup routes for the demand. Based on the state of the network, the node can select one of the backup routes. For example, a backup route can correspond to a set of SRLG failures. Detection of an SRLG failure in this set can cause the node to select the corresponding backup route.

In some embodiments, recovery services can include providing recovery messages to other component(s) (e.g., other ones of nodes 120, or the like) in communication network 160. Such messages can configure component(s) on the selected backup route of the demand to implement the backup route. For example, such messages can configure these component(s) to reserve communications capacity (e.g., bandwidth) for servicing the demand.

Network management system 150 can be a computer-based system including computer system components, desktop computers, workstations, tablets, handheld computing devices, memory devices, and/or internal network(s) connecting the components. Network management system 150 can be configured to manage communication network 160. For example, the network management system 150 may determine network routes and allocate resources for demands in the communication system 100 (e.g., by determining routing and wavelength assignment for a given set of demands).

Consistent with disclosed embodiments, network management system 150 (or another component of communication system 100) can be configured to generate a preplan assignment. In some embodiments, the preplan assignment can include data or instructions for configuring nodes in communication network 160. The data or instructions can specify certain nodes as being headends. In some embodiments, the data or instructions can specify, for each such headend, backup routes corresponding to communication link failures (e.g., SRLG failures). For example, the data or instructions can specify a mapping between such communication link failures (or configuration messages indicating such communication link failures) and backup routes. In some embodiments, the data or instructions can specify certain ones of nodes 120 as being reporting nodes. In some embodiments, the data or instructions can specify, for each such reporting node, sets of notification paths. Each set of notification paths can correspond to a headend and can be resilient against communication link failures, as described herein.

Network 140 can facilitate communication between the network management system 150 and the communication network 160. Network management system 150 may send data to nodes 120 via network 140 to allocate resources for demands in communication network 160. Network management system 150 may also receive data from nodes 120 via network 140. This data can indicate the status of communication links in communication network 160.

Network 140 may be an electronic network. Nodes 120 may be configured to receive data over network 140 and process/analyze queries and data. Examples of network 140 include a local area network (LAN), a wireless LAN (e.g., a "WiFi" or mesh network), a Metropolitan Area Network (MAN) that connects multiple LANs, a wide area network (WAN) (e.g., the Internet), a dial-up connection (e.g., using a V.90 protocol or a V.92 protocol), a satellite-based network, a cellular-based network, etc. In the embodiments described herein, the Internet may include any publicly accessible network or networks interconnected via one or more communication protocols, including, but not limited to, hypertext transfer protocol (HTTP/s) and transmission control protocol/internet protocol (TCP/IP). Moreover, the electronic network may also include one or more mobile device networks, such as a Long-Term Evolution (LTE) network or a Personal Communication Service (PCS) network, that allow mobile devices (e.g., client devices 130) to send and receive data via applicable communication protocols, including those described above.

In the illustrated example, nodes 120A and 120E are directly connected to network 140, and nodes 120B-120D connect to the network 140 via their connection to nodes 120A and/or 120E. Nodes 120B-120D may also directly connect to the network 140, or may indirectly connect to the network 140 through numerous other devices. Nodes 120 may be connected to one another via copper wire, coaxial cable, optical fiber, microwave links, or other satellite or radio communication components. Accordingly, nodes 120 may each have a corresponding communication interface (e.g., wireless transceiver, wired transceiver, adapter, etc.) to allow for such communications.

As shown in FIG. 1, nodes 120A-120E are connected to one another. In this example, node 120A is connected to node 120B, node 120B is connected to nodes 120A and 120C, node 120C is connected to node 120B, 120D, and 120E, node 120D is connected to node 120C, and node 120E is connected to node 120C. In some embodiments, the network management system 150 may obtain the connectivity status between the network devices 120 and generate a representation (e.g., a graph) of the connectivity of the network. In various embodiments, the network management system 150 can acquire the network topology from a server or a database associated with a service provider providing the communication network 160. As may be appreciated, the communication network 160 illustrated in FIG. 1 is not intended to be limiting. The disclosed embodiments include other service network configurations and topologies.

Network management system 150 can be implemented using one or more computing device (e.g., a node of node 120, a mobile device, laptop, desktop, workstation, server, computing cluster or cloud computing platform, or the like). Network management system 150 can be implemented as a distributed system over multiple computing devices. The disclosed embodiments are not limited to any particular implementation of network management system 150. In some embodiments, network management system 150 can be implemented over the nodes of communication network 160.

Database 170 can include one or more physical or virtual storages coupled with the network management system 150. Database 170 may be configured to store information associated with the communication network 160, such as a network topology, the capabilities of the nodes 120, the demands and corresponding configurations (e.g., routes or the like) provided by the communication network 160, and so on. Database 170 may also be adapted to store processed information associated with the network topology and demands in the communication network 160, so as to facilitate efficient route configurations and resource allocations to satisfy the demands in the communication network 160. For example, database 170 may be adapted to store a preplan assignment (or components thereof). The data stored in the database 170 may be transmitted to the network management system 150 and/or the nodes 120. In some embodiments, the database 170 can be stored in a cloud-based server (not shown) accessible to the network management system 150 and/or the nodes 120 through the network 140. While the database 170 is illustrated as an external device connected to the network management system 150, the database 170 may also reside within the network management system 150 as an internal component of the network management system 150. In some embodiments, the database 170 can be distributed among the nodes of communication network 160.

As shown in FIG. 1, nodes 120 can be connected with client devices 130 respectively to service demands. As an example, client devices 130 may include a display such as a television, tablet, computer monitor, video conferencing console, IoT device, or laptop computer screen. Client devices 130 may also include video/audio input devices such as a video camera, web camera, or the like. As another example, client devices 130 may include mobile devices (e.g., a wearable device, a tablet, a smartphone, a laptop, or other mobile device having display and video/audio capture capabilities). While FIG. 1 shows one client device 130 connected to each node, zero or more client devices 130 may be connected to a node.

In some embodiments, communication network 160 can include an optical network, where the nodes 120 are interconnected by optical fiber links. Such optical fiber links can include optical fiber links that support communication over multiple optical channels using multiple optical wavelengths. The optical network can be implemented, as least in part, using a wavelength division multiplexing (WDM) physical layer. A WDM optical signal can use a plurality of transmission channels, each channel carrying an information signal modulated over a carrier wavelength. A node can be configurable to switch a channel from an input fiber to an output fiber, or to add/drop traffic. A node can include a wavelength switch or an optical add/drop multiplexer that performs optical add, drop, and pass through. A node may include optical or optical/electrical elements configurable to perform functions including compensating, amplifying, switching, restoring, performing wavelength conversion of incoming optical signals, etc. The optical fiber links may include dispersion compensation fibers (DCF), optical filters, amplifiers, and other relevant optical components suitable for operation of optical networks. The network management system 150 or database 170 can store topologic data that includes information about optical channels and their associated wavelengths.

Figure 2:
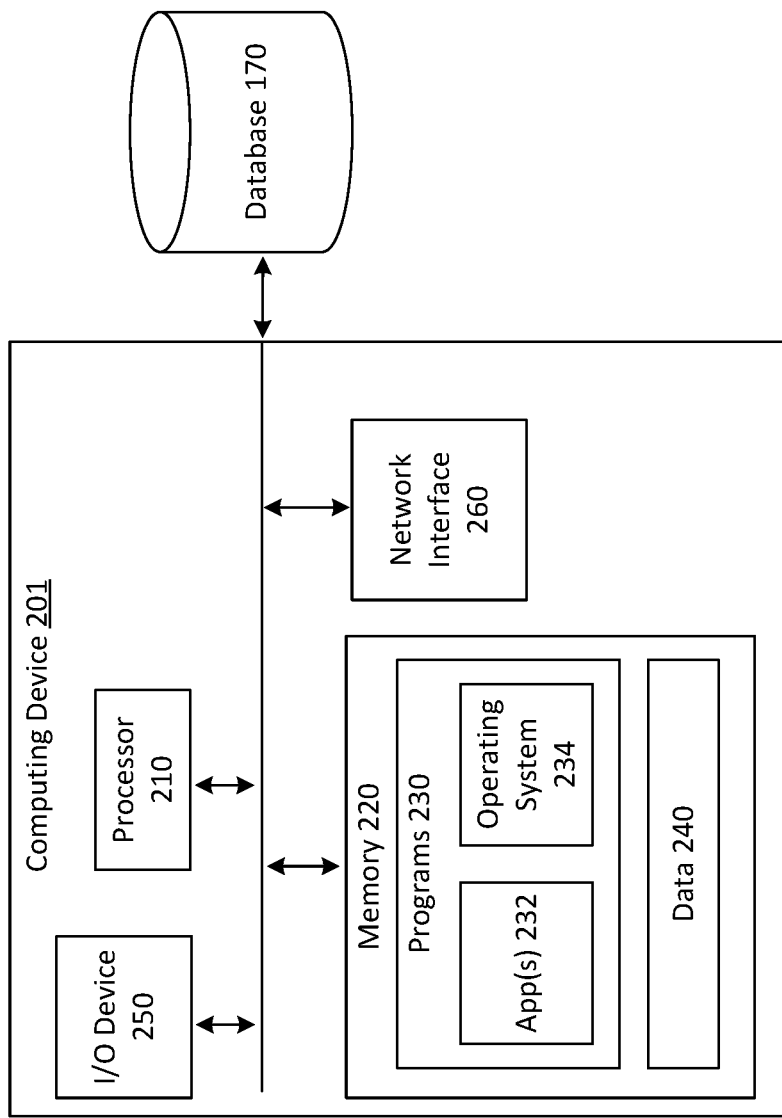
FIG. 2 depicts a diagram of an exemplary computing device suitable for implementing a network management system, consistent with disclosed embodiments.

FIG. 2 depicts a diagram of an exemplary computing device 201 (e.g., a mobile device, laptop, desktop, workstation, network appliance, or the like) suitable for implementing network management system 150, consistent with the disclosed embodiments. Network management system 150 can be implemented using one or more such computing devices 201 (e.g., a single computing device, a cluster of such computing devices, a virtual computing device running on such a computing device, a cloud-computing platform implemented using such devices, or another suitable implementation). Network management system 150 can be configured, by configuring the computing device(s) implementing network management system 150, to perform systems and methods for managing a communication network, consistent with disclosed embodiments. In such a manner, network management system 150 can be configured to generate a preplan assignment for a set of demands, given a graph of communication network 160.

Consistent with disclosed embodiments, computing device 201 can also be suitable for implementing a node, such as one or more of nodes 120. The one or more of nodes 120 can be configured, by configuring the computing device(s) implementing the one or more of nodes 120, to perform systems and methods for implementing a preplan assignment, consistent with disclosed embodiments. In such a manner, the one or more of nodes 120 can be configured to send messages concerning link failures or receive such messages, select backup routes based on the received messages, and provide messages to configure communication network 160 to implement the backup routes.

The computing device 201 can include a bus 202 (or other communication mechanism) which interconnects subsystems and components for transferring information within the computing device. As shown, the computing device 201 can include one or more processors 210, input/output ("I/O") devices 250, network interface 260 (e.g., a modem, Ethernet card, or any other interface configured to exchange data with a network), and one or more memories 220 storing programs 230 including, for example, server app(s) 232, operating system 234, and data 240, and can communicate with an external database 170 (which, for some embodiments, may be included within the computing device 201).

The processor 210 can be a central processing unit (CPU), graphical processing unit (GPU), application specific integrated circuit (ASIC) of system on a chip (SoC), field programmable gate array (FPGA), or the like. The processor 210 may comprise a single core or multiple core processors executing parallel processes simultaneously. For example, the processor 210 may be a single-core processor configured with virtual processing technologies. In certain embodiments, the processor 210 may use logical processors to simultaneously execute and control multiple processes. The processor 210 may implement virtual machine technologies, or other technologies to provide the ability to execute, control, run, manipulate, store, etc. multiple software processes, applications, programs, etc. In some embodiments, the processor 210 may include a multiple-core processor arrangement (e.g., dual, quad core, etc.) configured to provide parallel processing functionalities to allow the computing device 201 to execute multiple processes simultaneously. It is appreciated that other types of processor arrangements could be implemented that provide for the capabilities disclosed herein.

The memory 220 may be a volatile or non-volatile, magnetic, semiconductor, tape, optical, removable, non-removable, or other type of storage device or tangible or non-transitory computer-readable medium that stores one or more program(s) 230 such as server apps 232 and operating system 234, and data 240. Possible forms of non-transitory media include, for example, a flash drive, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, or any other flash memory, NVRAM, a cache, a register, any other memory chip or cartridge, and networked versions of the same.

Computing device 201 may include one or more storage devices configured to store information used by processor 210 (or other components) to perform certain functions related to the disclosed embodiments. For example, computing device 201 may include memory 220 that includes instructions to enable the processor 210 to execute one or more applications, such as server apps 232, operating system 234, and any other type of application or software known to be available on computer systems. Alternatively or additionally, the instructions, application programs, etc. may be stored in an external database 170 (which can also be internal to computing device 201) or external storage communicatively coupled with computing device 201 (not shown), such as one or more database or memory accessible over the network 140.

Database 170 or other external storage may be a volatile or non-volatile, magnetic, semiconductor, tape, optical, removable, non-removable, or other type of storage device or tangible or non-transitory computer-readable medium. The memory 220 and database 170 may include one or more memory devices that store data and instructions used to perform one or more features of the disclosed embodiments. The memory 220 and database 170 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases.

In some embodiments, computing device 201 may be communicatively connected to one or more remote memory devices (e.g., remote databases or the like) through network 140 or a different network. The remote memory devices can be configured to store information that the computing device 201 can access and/or manage. By way of example, the remote memory devices could be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

The programs 230 may include one or more software modules configured to cause processor 210 to perform one or more functions of the disclosed embodiments. Moreover, the processor 210 may execute one or more programs located remotely from one or more components of communication system 100. For example, computing device 201 may access one or more remote programs that, when executed, perform functions consistent with disclosed embodiments.

Consistent with disclosed embodiments, server app(s) 232 can cause processor 210 to perform functions consistent with disclosed embodiments. For example, server app(s) 232 can cause processor 210 to determine routes and allocate resources for services to be delivered in communication network 160 (e.g., by determining a preplan assignment for communication network 160). As an additional example, server app(s) 232 can cause processor 210 to determine backup paths based on received notification messages, or provide notification messages to headends in response to detection of a communication link failure.

In some embodiments, program(s) 230 may include operating system 234 performing operating system functions when executed by one or more processors such as processor 210. By way of example, operating system 234 may include Microsoft Windows™, Unix™, Linux™ Apple™ operating systems, Personal Digital Assistant (PDA) type operating systems, such as Apple iOS™, Google Android™, Blackberry OS™, or other types of operating systems. Accordingly, disclosed embodiments may operate and function with computer systems running any type of operating system 234. Computing device 201 may also include software that, when executed by processor 210, enables communication with network 140 through the network interface 260 and/or a direct connection to one or more nodes 120A-120E.

In some embodiments, data 240 may include, for example, network configurations, requirements of demands, routes for satisfying the demands (e.g., backup routes) and relationships between the routes (e.g., mappings between backup routes and communication link failures), capacities of the network devices, and so on. For example, data 240 may include network topology of the communication network 160 and operating status (e.g., operating properly or not operating properly) of the communication links between the nodes 120. The data 240 may also specify demand requirements and routes for each demand in the communication network 160.

Computing device 201 may also include one or more I/O devices 250 having one or more interfaces for receiving signals or input from devices and providing signals or output to one or more devices that allow data to be received and/or transmitted by network management system 150. For example, computing device 201 may include interface components for interfacing with one or more input devices (e.g., keyboard(s), mouse device(s), and the like) that enable computing device 201 to receive input from an operator or administrator (not shown).

Figure 3:
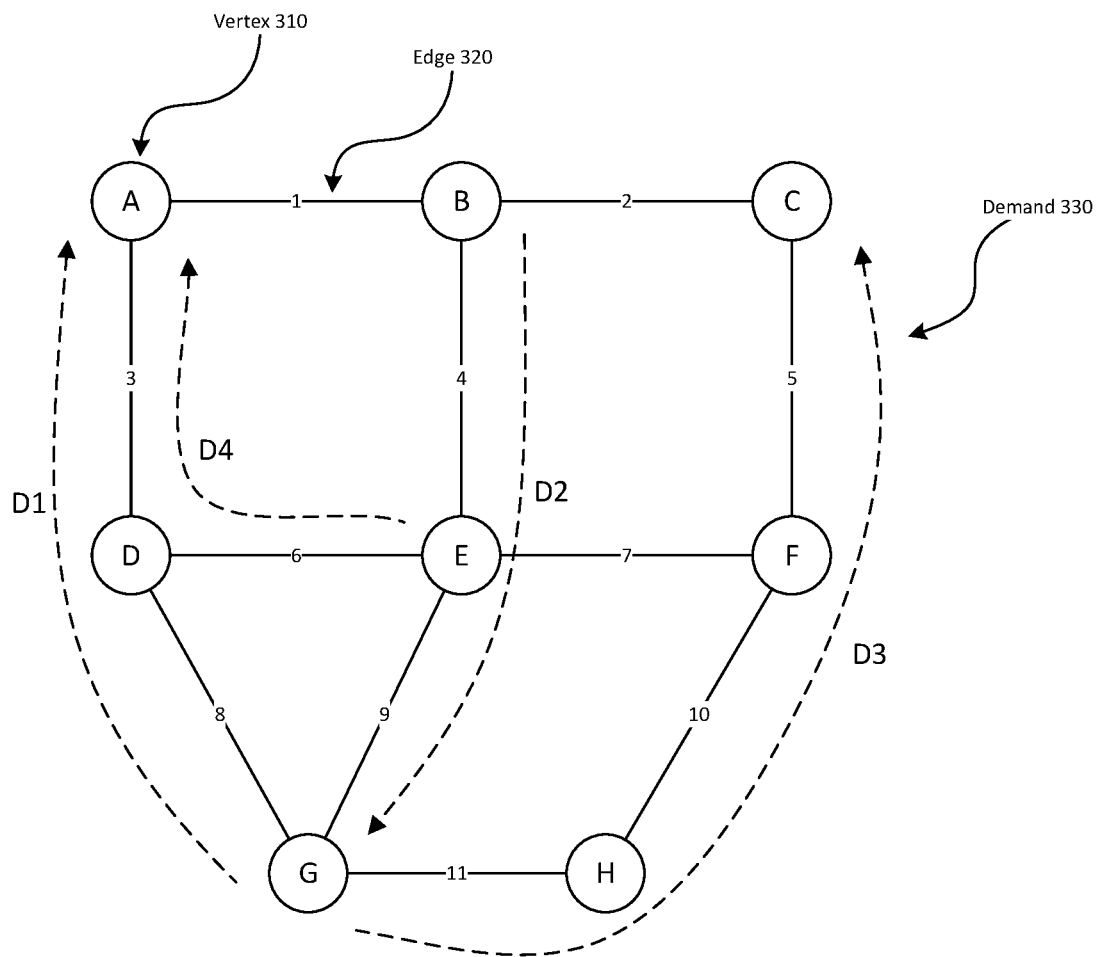
FIG. 3 depicts an exemplary communication network and associated demands, consistent with disclosed embodiments.

FIG. 3 depicts a graph 301 representing an exemplary communication network and associated demands, consistent with disclosed embodiments. As may be appreciated, graph 301 need not have a one-to-one correspondence with the communication network. In some embodiments, graph 301 can be a simplified or functional representation of the communication network. Furthermore, the disclosed embodiments are not limited to any particular implementation of graph 301. For example, in some embodiments graph 301 can be implemented as an adjacency list or matrix. Operations performed using graph 301, as described herein, can be performed using such an adjacency list or matrix.

In the example depicted in FIG. 3, graph 301 has vertices V (e.g., vertex 310) and edges E (e.g., edge 320). For convenience, each vertex in FIG. 3 has been assigned an alphabetical label between A and G and each edge in FIG. 3 has been assigned an numerical label between 1 and 11. Graph 301 includes a set of demands $D=\{d_1, \ldots, d_j\}$, where $d_i=\{s_i, t_i\}$, $s_i$ being the ith source vertex and $t_i$ being the ith target vertex (e.g., demand 330). The set $path(v,u) \in 2^E$ is the set of all paths on the graph between v and u. Each demand has a main path $M(d_i) \in path(s_i, t_i)$. Thus the demands can be described as follows:

$d_1$ {G, A} with M($d_1$)={8, 3}
$d_2$={B, G} with M($d_2$)={4, 9}
$d_3$={G, C} with M($d_3$)={11, 10, 5}
$d_4$={E, A} with M($d_4$)={6, 3}

Figure 4:
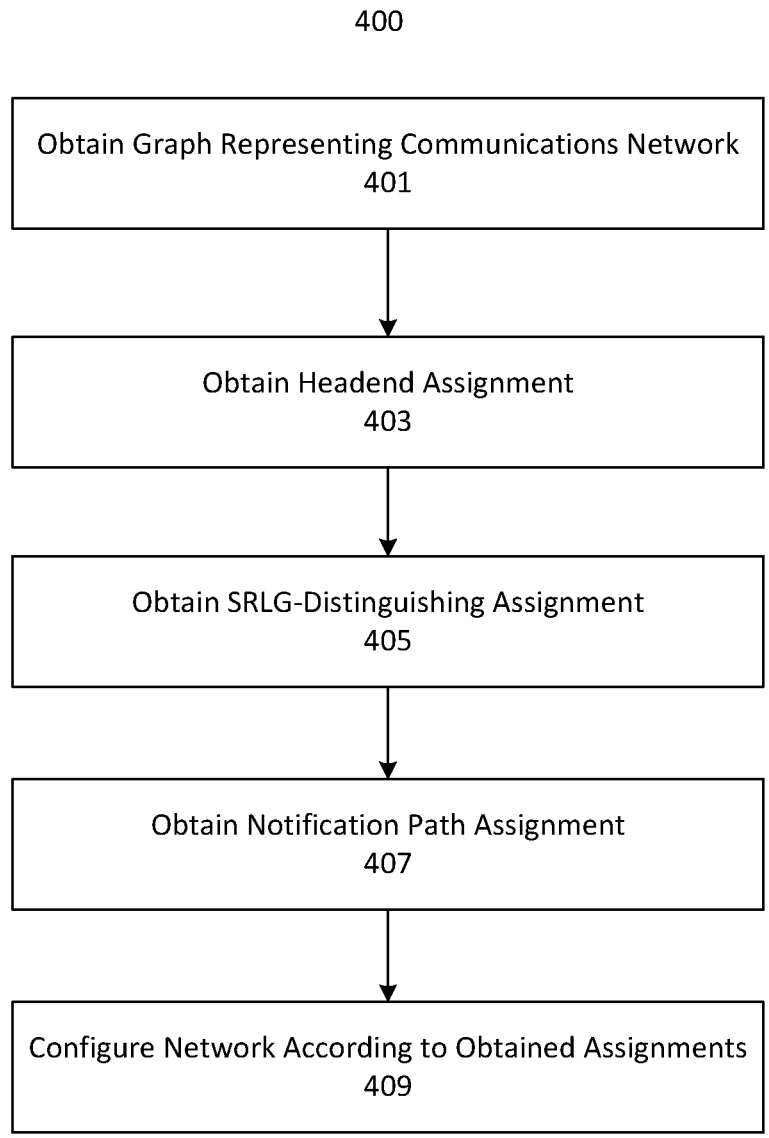
FIG. 4 depicts an exemplary process for generation and use of a preplan assignment, consistent with disclosed embodiments.

FIG. 4 depicts an exemplary process 400 for generation and use of a preplan assignment, consistent with disclosed embodiments. Process 400 can be used with communication networks having the components and configuration described with regards to FIGS. 1 and 2. Process 400 can be used with communication networks having other components or configurations, or having other topologies.

Consistent with disclosed embodiments, process 400 can generate a preplan assignment that specifies headend assignments and notification paths. In some embodiments, the preplan assignment can specify backup routes for demands (e.g., recovery routes to use in case of a communication link failure on the main route for the demand). In some embodiments, a preplan assignment can include instructions for configuring headends to identify SRLG failures and select corresponding backup route(s) disjoint with the failed SRLGs. In some embodiments, the instructions can further specify mappings from received notification messages to failed SRLGs. In some embodiments, the instructions can further specify decision timer values for headends. A decision timer value can be the time a headend waits to collect notification messages before attempting to determine which backup path to use in case of a failure. The decision timer value can be specific to a headend (or even a demand). The decision timing for a headend can depend, at least in part, upon a number of notification messages required to identify a failed SRLG affecting the headend (or demand), a time required for the notification messages to reach the headend, or a time required to process the received notification messages (e.g., identify the failed SRLG affecting the headend). As may be appreciated, other configuration parameters can be specified in the preplan assignment: the disclosed backup routes, notification paths, and decision timer value are not intended to be limiting.

In step 401 of process 400, a graph representing communication network 160 can be obtained, consistent with disclosed embodiments. The graph can be obtained by a component of communication system 100 (e.g., network management system 150, or another component) configured to generate the preplan assignment. In some embodiments, this component can receive or retrieve the graph from another component of communication system 100 (e.g., database 170, or the like). In some embodiments, this component can generate the graph using obtained topology information. The topology information can specify nodes and communication links of communication network 160. The topology information can be received from component(s) of communication network 160 (e.g., nodes 120, database 170, or the like). The disclosed embodiments are not limited to a particular protocol or format for transmission of the graph or of the topology information.

Generation of the graph can include collecting and combining sufficient topology information to construct a representation of communication network 160 having vertices corresponding to nodes 120 and edges corresponding to the communication links connecting ones of nodes 120. The disclosed embodiments are not limited to any particular method of generating the graph.

In step 403 of process of 400, a headend assignment can be obtained, consistent with disclosed embodiments. The headend assignment can specify, for each demand, a vertex in the graph to serve as the headend for that demand. In some embodiments, the specified headend can be either the source vertex or target vertex for the demand. In some embodiments, the headend assignment can be obtained by a component of communication system 100 (e.g., network management system 150, or another component) configured to generate the preplan assignment. In some embodiments, this component can receive or retrieve the headend assignment from another component of communication system 100 (e.g., database 170, or the like). In some embodiments, this component can generate the headend assignment using the set of demands. Consistent with disclosed embodiments, the headend assignment can be formulated as a set covering problem. This set covering problem can be solved using integer linear programming or greedy selection methods.

In step 405 of process 400, an SRLG-distinguishing assignment can be obtained, consistent with disclosed embodiments. The SRLG-distinguishing assignment can specify, for each headend, reporting edges sufficient to distinguish among SRLGs affecting the headend. The intersection of the reporting edges and any failed SRLG affecting the headend can be sufficient to uniquely identify that SRLG. In some embodiments, the SRLG-distinguishing assignment can be obtained by a component of communication system 100 (e.g., network management system 150, or another component) configured to generate the preplan assignment. In some embodiments, this component can receive or retrieve the SRLG-distinguishing assignment from another component of communication system 100 (e.g., database 170, or the like). In some embodiments, this component can generate the SRLG-distinguishing assignment using the headend assignment and the SRLGs.

Consistent with disclosed embodiments, the SRLG-distinguishing assignment can be incrementally constructed for each headend. In some embodiment, a set of edges can be initialized for each headend. The set of edges can be initialized to the union of the edges on the main paths of all the demands assigned to the headend. Edges on the graph can then be incrementally added to the set of edges. The edges can be selected based on an incremental benefit (and optionally on an incremental cost). The edges can satisfy a resilience condition.

In step 407 of process 400, a notification path assignment can be obtained, consistent with disclosed embodiments. The notification path assignment can specify, for each headend and edge in the SRLG-distinguishing assignment, a set of paths between an endpoint of the edge and the headend. In some embodiments, the notification path assignment can be obtained by a component of communication system 100 (e.g., network management system 150, or another component) configured to generate the preplan assignment. In some embodiments, this component can receive or retrieve the notification path assignment from another component of communication system 100 (e.g., database 170, or the like). In some embodiments, this component can generate the notification path assignment using the headend assignment, the SRLG-distinguishing assignment, and the SRLGs.

Consistent with disclosed embodiments, the set of notification paths can be incrementally constructed. For each headend, edge assigned to the headend in the SRLG-distinguishing assignment, and SRLG affecting the headed, a notification path can be determined from an endpoint of the edge to the headend. The notification path can be disjoint to the SRLG affecting the headed, ensuring the resilience of the notification path to a failure of that SRLG. The notification path can be selected based on a benefit parameter value (and optionally on a cost parameter value).

Consistent with disclosed embodiments, when the preplan assignment includes decision timer values, these values can be determined based on the notification path assignments (and optionally the graph of the communication network). The notification path assignments can include information concerning the number of edge endpoints providing messages to each headend for each SRLG failure affecting that headend. In some embodiments, the notification path assignments can include information about the length of each notification path (and thus the estimated delay in receiving a notification message provided along that notification path). In some embodiments, the decision timer value can depend upon the number of edges providing messages to a headend, a per message processing time of the headend, and optionally a time margin. For example, when a headend requires 10 ms to process a message, a maximum number of messages received by the headend (e.g., over the SRLG failures potentially affecting the headend) is 32, and a time margin of 10% is used, the decision timer value can be 352 ms.

In step 409 of process 400, communication network 160 can be configured according to the obtained assignments, consistent with disclosed embodiments. In some embodiments, components of communication network 160 (e.g., nodes 120, or the like) can receive or retrieve instructions. These instructions can be part of, or specified by, the preplan assignment. When processed by the components, the instructions can cause the components to (e.g., collectively) implement the preplan assignment. For example, a node can be configured by such instructions to serve as a headend for a demand (e.g., in accordance with the headend assignment). The node can be configured to receive failure messages and determine a backup route for the demand based on the received failure messages (e.g., in accordance with an SRLG-distinguishing assignment for that headend). As an additional example, a node can be configured by such instructions to provide notification messages in response to a failure of a communication link terminating on the node (e.g., in accordance with a notification path assignment). As may be appreciated, a node can both be a headend (with respect to one demand) and a provide notification messages (with respect to another demand). In some embodiments, the instructions can be received or retrieved from the component of communication system 100 (or another system) that generated the preplan assignment (e.g., network management system 150, or the like). In various embodiments, the instructions can be received or retrieved from another component (e.g., database 170, or the like).

In some embodiments, communication network 160 can be configured to generate a new preplan assignment repeatedly, periodically, or according to a schedule. In various embodiments, communication network 160 can be configured to generate a new preplan assignment in response to a change in network 150. Such changes could include the addition (or restoration following failure) of a new node or communication link. Such changes could further include the detection of a failed node or communication link.

In some embodiments, as described herein, communication network 160 can generate a preplan assignment suitable for multiple sequential failures. Such a preplan assignment can include multiple layers. A first layer can include a first preplan assignment. The network can be configured to implement the first preplan assignment prior to failure of an SRLG. A second layer can include second preplan assignments. Each of the second preplan assignments can correspond to a different SRLG on the network. After recovering from the failure of a first SRLG according to the first preplan assignment, the network can be configured to implement a second preplan assignment corresponding to the first SRLG. In some embodiments, a third layer can include third preplan assignments. Each of the second preplan assignments can correspond to a different combination of two SRLGs on the network. After recovering from the failure of a first SRLG according to the first preplan assignment and recovering from the failure of a second SRLG according to a second preplan assignment that corresponds to the first SRLG, the network can be configured to implement a third preplan assignment corresponding to the combination of the first SRLG and the second SRLG. As may be appreciated, a preplan assignment is not limited to two or three layers, but may include four or more layers.

Consistent with disclosed embodiments, preplan assignments in the second, third, or subsequent layers can be generated using a modified network topology and modified SRLG set. As described herein, such preplan assignments can correspond to an SRLG (e.g., in the second layer) or combination of SRLGs (e.g., in the third or subsequent layers). The modified network topology can be the original network topology minus the edges included in the corresponding SRLG or combination of SRLGs. The modified SRLG set can be the original SRLG set with the corresponding SRLG or combination of SRLGs removed, the edges included in the corresponding SRLG or combination of SRLGs removed from the remaining SRLGs, and the remaining SRLGs deduplicated.

In some embodiments, the network can be configured with a preplan including multiple layers. For example, a network management system can provide instructions to network nodes to implement a preplan including multiple layers. The instructions can enable the network nodes to select among preplans in the layers based on the current topology of the network. The instructions can also enable the network nodes to implement the selected preplan. In various embodiments, the network can be configured with a preplan selected based on the current topology of the network. For example, a network management system can generate a preplan including multiple levels. The network management system can provide instructions to network nodes to implement the first preplan assignment of the first layer. The network management system can subsequently select among layers and preplans based on the current topology of the network. The network management system can then provide instructions to the network nodes to implement the selected preplan assignment.

Figure 5:
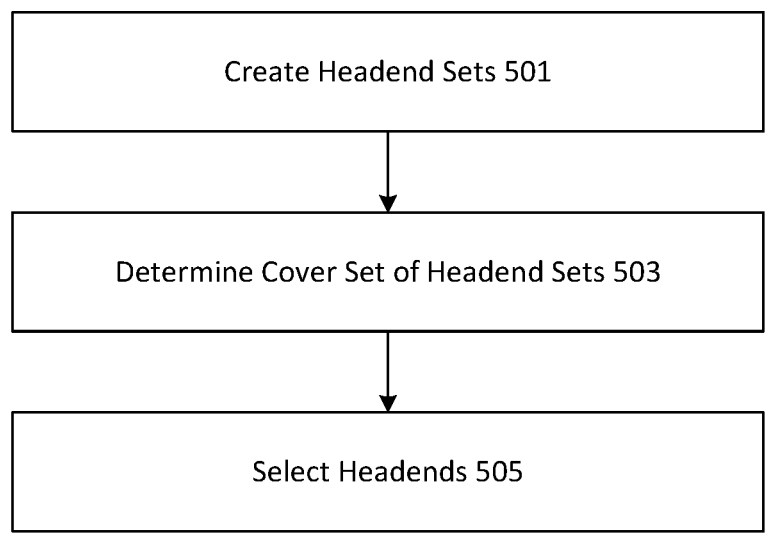
FIG. 5 depicts an exemplary process for selecting headends for a communication network, consistent with disclosed embodiments.

FIG. 5 depicts an exemplary process 500 for selecting headends for a communication network, consistent with disclosed embodiments. Inputs to process 500 can include a graph (or topology information suitable for creating such a graph) and demands on the graph. Outputs of process 500 can include a headend assignment that associates each demand on the graph with a headend vertex on the graph. Consistent with disclosed embodiments, process 500 can include formulating the selection of headends as a set covering problem subject to a particular cost function. Greedy search methods or integer linear programming methods can be used to solve the set cover problem subject to the cost function.

In some embodiments, process 500 can be performed as part of process 400, described above with regards to FIG. 4. For example, process 500 can be performed to obtain a headend assignment in step 403 of process 400. However, process 500 need not be performed as a step in process 400. Instead, process 500 can be performed as a stand-alone process or as a step in a different process of configuring a communication network.

For convenience of explanation, process 500 is described herein as being performed by a component of a communication system (e.g., communication system 100, or the like), such as a network management system (e.g., network management system 150, or the like). However, process 500 need not be performed by a network management system. Instead, process 500 can be performed by another component of a communication system, such as a node of a communication network (e.g., one of nodes 120, or the like). In some embodiments, process 500 can be performed by another computing system that obtains any necessary information for generating the headend assignment from a network management system of a communication system. For convenience of explanation, process 500 is described with reference to graph 301 depicted in FIG. 3.

In step 501 of process 500, the component of the communication system can create headend sets, consistent with disclosed embodiments. In some embodiments, a headend set can include one endpoint of one of the demands on a graph representing the communication network. Where demands $D=\{d_1, \ldots, d_i\}$ and $E=\{u_1, \ldots, u_j\}$ is the set of all endpoints of demands in D, then for k=1 to j we define the headend set $h_k=\{u_k\} \cup \{d_l | d_l \cap u_k \neq \emptyset\}$ where l=1 to i. With reference to the demands on graph 301 of FIG. 3, such headend sets can be constructed as follows:

$$D=\{d_1,d_2,d_3,d_4\}$$

$$E=\{a,b,c,g,e\}$$

$$h_1=\{a\} \cup \{d_l | d_l \cap a \neq \emptyset\}=\{a,d_1,d_4\}$$

$$h_2=\{b\} \cup \{d_l | d_l \cap b \neq \emptyset\}=\{b,d_2\}$$

$$h_3=\{c\} \cup \{d_l | d_l \Omega c \neq \emptyset\}=\{c,d_3\}$$

$$h_4=\{g\} \cup \{d_l | d_l \cap g \neq \emptyset\}=\{g,d_1,d_2,d_3\}$$

$$h_5=\{e\} \cup \{d_l | d_l \cap e \neq \emptyset\}=\{e,d_4\}$$

In some embodiments, each headend set can be associated with an endpoint, but not include the endpoint. Such a headend set can be formulated as $h_k=\{d_l | d_l \cap u_k \neq \emptyset\}$. With reference to the demands on graph 301 of FIG. 3, in such a formulation, $h_4=\{d_l | d_l \cap g \neq \emptyset\}=\{d_1, d_2, d_3\}$.

In step 503 of process 500, the component of the communication system can determine a cover set of the headend sets, consistent with disclosed embodiments. In some embodiments, the cover set can be a "red-blue" cover set, with the headend sets selected to cover all the demands and a minimum set of the endpoints. In such embodiments, headend selection can encourage reuse of endpoints as headends for multiple demands. In such embodiments, suitable techniques for determining red-blue set covers can be used to select the headends.

In some embodiments, a headend set can be selected greedily to increase the number of demands in the covered set. For example, with respect to the demands on graph 301, $h_4$ may be selected first (as it adds three demands to the covered set) and then any one of $h_1$, $h_2$, $h_3$, $h_5$, as each of these sets would only add one demand to the number of costed demands (as demand $d_1$ of set $h_1$ would already be included in the covered set). In some embodiments, when two headend sets would both increase the number of demands in the covered set by the same amount, the component can select the one of the headend sets having the lower cost. In some embodiments, the cost can depend on the endpoint included in (or associated with) the selected headend set. In some embodiments, a lower cost (e.g., a zero cost) can be associated with an endpoint already included in (or associated with) the covered set. A higher cost (e.g., a greater than zero cost) can be associated with an endpoint not already included in (or associated with) the covered set. Such a cost function can encourage reuse of endpoints as headends for multiple demands.

In some embodiments, a headend set can be selected using integer linear programming. The integer linear programming problem can be framed, at least in part, as minimizing a cost function dependent on the selection of headend sets, subject to the condition that the selected headend sets cover the set of demands. Consistent with disclosed embodiments, the cost function can depend on the number of endpoints included in the cover set. In some embodiments, the cost function can depend on a degree of reuse of each endpoint. Up to a certain threshold (which may depend on the hardware or software capabilities of a node associated with an endpoint) increasing reuse of the endpoint can reduce the value of the cost function. Beyond that threshold, increasing reuse of the endpoint can increase the value of the cost function (e.g., to penalize overloading the node associated with the endpoint). With respect to the demands of graph 301, the component may select $h_1$ and $h_4$ rather than $h_1$, $h_2$, $h_3$ and $h_5$ to encourage reuse of endpoint g.

In step 505 of process 500, the component of the communication system can select endpoints in the covered set (or associated with the covered set) as headends, consistent with disclosed embodiments. As may be appreciated, the covered set may include multiple endpoints that can potentially be the headend for the same demand. With respect to graph 301, should the component select headend sets $h_1$ and $h_4$, the endpoints g and a can both be potential headends for the demand $d_1$. In such instances, the component can select one of the potential endpoints for the demand based on a cost function (which may be the same cost function used in step 503). As described with regards to step 503, such a cost function can encourage reuse of endpoints as headends. In some embodiments, such reuse may only be favored up to a point. As an example and with respect to graph 301, the component may select a as the headend for demand $d_1$, to avoid burdening endpoint g with the responsibility for three demands.

Consistent with disclosed embodiments, the headend assignment generated by performance of process 500 can be stored or provided to another computing system. In some embodiments, when process 500 is performed as part of another process, the SRLG-distinguishing assignment can be used as an input to another step of that process. For example, when process 500 is performed as step 403 of process 400, the headend assignment can be used as an input to step 405 of process 400.

Figure 6:
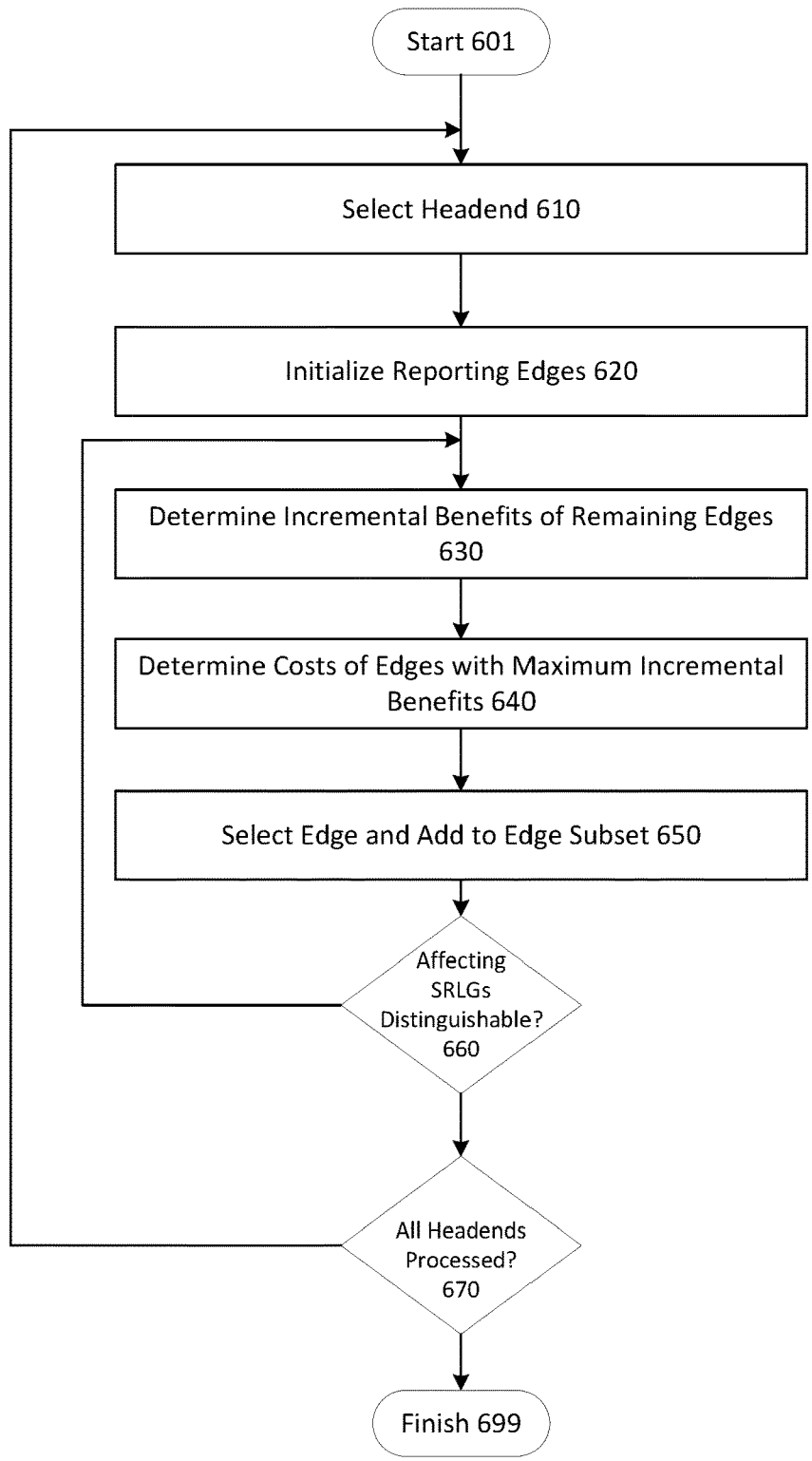
FIG. 6 depicts an exemplary process for selecting a reporting set of edges sufficient to distinguish affecting SRLGs, consistent with disclosed embodiments.

FIG. 6 depicts an exemplary process 600 for generating an SRLG-distinguishing assignment, consistent with disclosed embodiments. Inputs to process 600 can include a graph, demands on the graph (or main paths of such demands), a headend assignment (e.g., a headend assignment generated by process 500, or the like), and a set SRLG of n shared risk link groups. The set SRLG can be defined as SRLG= $\{x_1, \ldots, x_n\}$, where $x_i \in 2^E$. In some embodiments, such inputs can include an increment benefit function (or parameters thereof) or an increment cost function (or parameters thereof). In some embodiments, such inputs can include an indication of affecting SRLGs for each headend. Outputs of process 600 can include an SRLG-distinguishing assignment that associates each headend with corresponding reporting edges on the graph. The reporting edges can be sufficient to identify any SRLG failure affecting the headend. Consistent with disclosed embodiments, process 600 can include selecting an edge based on an incremental benefit (and optionally an incremental cost) associated with the edge. In some embodiments, the edge can be selected based on the satisfaction of a resilience condition.

In some embodiments, process 600 can be performed as part of process 400, described above with regards to FIG. 4. For example, process 600 can be performed to obtain an SRLG-distinguishing assignment in step 405 of process 400. However, process 600 need not be performed as a step in process 400. Instead, process 600 can be performed as a stand-alone process or as a step in a different process of configuring a communication network.

For convenience of explanation, process 600 is described herein as being performed by a component of a communication system (e.g., communication system 100, or the like), such as a network management system (e.g., network management system 150, or the like). However, process 600 need not be performed by a network management system. Instead, process 600 can be performed by another component of a communication system, such as a node of a communication network (e.g., one of nodes 120, or the like). In some embodiments, process 600 can be performed by another computing system that obtains any necessary information for generating the SRLG-distinguishing assignment from a network management system of a communication system.

For convenience of explanation, process 600 is described herein with reference to graph 301, depicted in FIG. 3. As previously discussed, endpoints a and g can be selected as headends for demands D={$d_1$, $d_2$, $d_3$, $d_4$} on graph 301. Each headend v can have a main path, which can be defined as the union of the main paths of the demands associated with that headend. For example:

$M(g)=M(d_2) \cup M(d_3)=\{4,5,9,10,11\}$ $M(a)=M(d_1) \cup M(d_4)=\{3,6,8\}$

In this example, {$x_1$, $x_2$, $x_3$, $x_4$, $x_5$, $x_6$, $x_7$} ⊂ SRLG, with the explicitly identified SRLGs as follows:

$x_1=\{1,3,4\}$ $x_2=\{3,4,6\}$ $x_3=\{8,9\}$ $x_4=\{5,10\}$ $x_5=\{1,6\}$ $x_6=\{2,7\}$ $x_7=\{11\}$

In addition to these explicitly identified SRLGs, we assume that SRLG includes all other singleton edges {$e_j | e_j \in E$}. However, for convenience of explanation, we will limit our discussion to the above explicitly identified SRLGs (which are either on the main path of a demand or in a non-singleton SRLG). As may be appreciated, in this example each edge is associated with at least one SRLG and each SRLG includes at least one edge. An affecting set for a headend v can include those SRLGs that overlap with an edge in the main path of the headend: $A(v) \in 2^{SRLG}=\{x_j | M(d_i) \cap x_j \neq \emptyset\}$. In this example:

$A(g)=\{x_1,x_2,x_3,x_4,x_7,\}$ $A(a)=\{x_1,x_2,x_3,x_5\}$

SRLGs defined on a graph may not be affecting SRLGs. In this case, $x_6$ does not affect either headend g or headend a. In some embodiments, only affecting SRLGs are considered in generating an SRLG-distinguishing assignment.

In step 601, a component of a communication system can start process 600, consistent with disclosed embodiments. In some embodiments, the component can obtain inputs for performing process 600. As may be appreciated, obtaining an input can include receiving or retrieving the input, or generating the input from other information. For example, a component can generate a graph of a communication network from topology information received from components of the communication network.

In step 610 of process 600, the component can select a headend, consistent with disclosed embodiments. The headend can be selected from among the headends that have not previously been selected. In various embodiments, the headend can be selected randomly or deterministically (e.g., according to rules, heuristics, or the like). For example, the component can select headends randomly or sequentially from a list. As an additional example, the component can select the headend associated with the most demands, associated with the most affecting SRLGs, including the most main path edges, or the like. As an example, with reference to FIG. 3, headend g can be selected. In this example, demands $d_1$ to $d_3$ are assigned to headend g, while demand $d_4$ is assigned to headend a. Thus the main paths associated with the headends are:

$M(g)=M(d_1) \cup M(d_2) \cup M(d_3)=\{3,4,5,8,9,10,11\}$ $M(a)=M(d_4)=\{3,6\}$

The affecting SRLGs are:

$A(g)=\{x_1,x_2,x_3,x_4,x_7,\}$ $A(a)=\{x_1,x_2,x_5\}$

In step 620 of process 600, the component can initialize a set of reporting edges for the headend selected in step 610, consistent with disclosed embodiments. In some embodiments, the set of reporting edges can be initialized to the edges in the main paths associated with the headend. As an example, with reference to FIG. 3, a reporting set r can be initialized:

$r=M(g)=\{3,4,5,8,9,10,11\}$.

In step 630 of process 600, the component can determine incremental benefit values for unselected edges in the graph, consistent with disclosed embodiments. In some embodiments, the component can only consider edges that satisfy a resilience condition.

Consistent with disclosed embodiments, the resilience condition can require that, for every SRLG that affects the headend and includes the edge, an SRLG-disjoint path exist from an endpoint of the edge to the headend. As an example, with reference to FIG. 3, only SRLGs $x_2$ and $x_5$ include edge e=6. With respect to headend g, paths between endpoints of edge e=6 and headend g exist that are disjoint with both SRLGs $x_2$ and $x_5$. Thus edge e=6 can be a candidate edge for inclusion in the set reporting edges. Similarly, only SRLGs $x_1$ and $x_5$ include edge e=1. With respect to headend g, paths between endpoints of edge e=1 and headend g exist that are disjoint with both SRLGs $x_1$ and $x_5$. Thus edge e=1 can be a candidate edge for inclusion in the set reporting edges.

Given the set of reporting edges $f(v)$, a set of indistinguishable SRLGs I can be defined for each SRLG affecting the headend:

$x_i \in A(v)$.

$I(v, f(v), x_i)=\{x_j \in A(v) | x_j \cap f(v) = x_i \cap f(v)\}$

Including an unselected edge e in the set of reporting edges $f(v)$ can change the sets of indistinguishable SRLGs associated with the headend:

$$I(v,f(v),x_i) \neq I(v,f(v) \cup e, x_i)$$

The incremental benefit of selecting the edge e in the set of reporting edges can depend on the changed sets of indistinguishable SRLGs. In various embodiments, the incremental benefit of selecting the edge e can depend on the number of such sets changed, on the magnitude of the change (e.g., reductions in the sizes of the changed sets of indistinguishable SRLGs, or the like), or the particular sets changed. As an example, with reference to FIG. 3, $$I(g,r,x_1) = \{x_j \in A(v) | x_j \cap r = x_1 \cap r\}$$

$$I(g,r,x_1) = \{x_j \in A(v) | x_j \cap r = \{3,4\}\}$$

$$I(g,r,x_1) = \{x_1, x_2\}$$

Thus the set of indistinguishable SRLGs for SRLG $x_1$ includes both $x_1$ and $x_2$. The sets of indistinguishable SRLGs for $x_2$, $x_3$, $x_4$ and $x_7$ are as follows ($x_5$ and $x_6$ do not affect headend g).

$$I(g,r,x_2) = \{x_j \in A(v) | x_j \cap r = \{3,4\}\}$$

$$I(g,r,x_2) = \{x_1, x_2\}$$

$$I(g,r,x_3) = \{x_j \in A(v) | x_j \cap r = \{8,9\}\}$$

$$I(g,r,x_3) = \{x_3\}$$

$$I(g,r,x_4) = \{x_j \in A(v) | x_j \cap r = \{5,10\}\}$$

$$I(g,r,x_4) = \{x_4\}$$

$$I(g,r,x_7) = \{x_j \in A(v) | x_j \cap r = \{11\}\}$$

$$I(g,r,x_7) = \{x_7\}$$

Thus only the sets of indistinguishable SRLGs for $x_1$ and $x_2$ require additional refinement. The other SRLGs can already be uniquely distinguished based on the edges already in the set of reporting edges.

As an example, select e=2. Then $r \cup e = \{2,3,4,5, 8, 9, 10, 11\}$. But adding this edge does not change $I(g, r, x_1)$ or $I(g, r, x_2)$. So adding this edge provides no incremental benefit.

As an additional example, select e=6. Then $r \cup e = \{3, 4, 5, 6, 8, 9, 10, 11\}$. Then:

$$I(g, r \cup e, x_1) = \{x_j \in A(v) | x_j \cap (r \cup e) = \{3,4\}\}$$

But $x_2 \cap (r \cup e) = \{3, 4, 6\}$ and so $I(g, r \cup e, x_1) = \{x_1\}$.

For similar reasons, $I(g, r \cup e, x_2) = \{x_2\}$. Thus two sets of indistinguishable SRLGs are changed by adding edge e=6 to the set of reporting edges. So adding this edge provides an incremental benefit. Assuming, in this example, that each incremental benefit is similarly weighted, the incremental benefit of adding edge e=6 can be 2.

As an additional example, select e=1. Then $r \cup e = \{1, 3, 4, 5, 8, 9, 10, 11\}$. Then:

$$I(g, r \cup e, x_1) = \{x_j \in A(v) | x_j \cap (r \cup e) = \{1,3,4\}\}$$

But $x_2 \cap (r \cup e) = \{3,4\}$ and so $I(g, r \cup e, x_1) = \{x_1\}$.

For similar reasons, $I(g, r \cup e, x_2) = \{x_2\}$. As with adding edge e=6 to the set of reporting edges, two sets of indistinguishable SRLGs are changed by adding edge e=1. Assuming, in this example, that each incremental benefit is similarly weighted, the incremental benefit of adding edge e=1 can be 2.

In some embodiments, process 600 can proceed to step 640 when 1) multiple edges are identified in step 630 as having similar incremental benefits and 2) the similar incremental benefits are the greatest incremental benefits identified in step 630. Multiple edges can have similar incremental benefits when they have the same incremental benefit. In some embodiments, multiple edges can have similar incremental benefits when each pair of the multiple edges have incremental benefits that differ by less than some threshold amount (or percentage).

In step 640 of process 600, the component can determine incremental costs for edges having similar incremental benefits, consistent with disclosed embodiments. The incremental cost for each edge can depend on a cost function. The cost function can be evaluated based on 1) the reporting edges and 2) the reporting edges plus the additional edge. The incremental cost for the additional edge can be (or depend upon) a difference between these two evaluations.

The disclosed embodiments are not limited to a particular cost function. In some embodiments, a suitable cost function can depend upon the reporting edges (or the reporting edges and the additional edge). In some embodiments, the cost function can depend on the number of headends associated with each reporting edge (or the maximum number of headends associated with any reporting edge). As described herein, this number of headends can determine the number of notification messages (or maximum number of notification messages) sent by endpoints of the reporting edges. Reducing the number of headends can reduce the number of notification messages sent, thereby reducing the transmission time (or maximum transmission time) required to provide the notification messages to the headends. In some embodiments, the cost function can depend on the number of edges associated with each headend (or the maximum number of edges associated with any headend). As described herein, the number of edges can determine the number of notification messages (or maximum number of notification messages) received by the headends. Reducing the number of edges can reduce the number of notification messages, thereby reducing the processing time (or maximum processing time) required to determine the status of the communication network following an SRLG failure. Reducing the maximum processing or transmission time can reduce the overall time required for the communication network to recover from an SRLG failure.

Consistent with disclosed embodiments, an exemplary cost function can be:

$$\text{cost}(f) = \max_{s \in SRLG}(a \cdot \max_{e \in s}|\hat{f}(e)| + b \cdot \max_{v}|f(v) \cap s|)$$

In this cost function, the function $f: v \to 2^{edges}$ can be a mapping from headends to sets of edges (e.g., reporting edges) in the graph. The function $\hat{f}(e) = \{v \in V: e \in f(v)\}$ can be the set of headends that include the edge e among the reporting edges for those headends. Thus $\max_{e \in s}|\hat{f}(e)|$ can be the maximum number of headends to which an edge in an SRLG reports (as SRLG includes singleton edges, s can be a singleton SRLG) and therefore the maximum number of notification messages sent by an edge when that SRLG fails.

In the cost function, $\max_v|f(v) \cap s|$ can be the maximum number of edges in the intersection of the reporting edges for a headend and an SRLG, and therefore the maximum number of messages received by a headend when that SRLG fails.

Thus, in this example, the cost function can be the maximum taken over the SRLGs of the constant a times {the maximum number of notification messages sent by an edge when a particular SRLG fails} plus the constant b times {the maximum number of messages received by a headend when the particular SRLG fails}. In the cost function, the constants a and b can be weights that trade off the relative importance of minimizing the number of messages sent and minimizing the number of messages received.

In some embodiments, the above cost function can be modified. When a headend is an endpoint of an edge in the reporting edges, no notification message may be required for the headend to determine that the edge has failed. Thus such an edge may not contribute to the costs associated with the headend (e.g., the costs associated with sending a message to that headend or the costs associated with receiving a message from that headend).

With respect to the example depicted in FIG. 3 and as described with regards to step 630, both edges 1 and 6 have equal incremental benefits. The cost function for the original reporting edges can be determined as follows:

$\max_a |f(a) \cap x_i| = \max|\{3,6\} \cap x_i| = 2$ for $x_2$, 1 for $x_1$ and $x_5$, and zero otherwise.

$\max_g |f(g) \cap x_i| = \max|\{3, 4, 5, 8, 9, 10, 11\} \cap x_i| = 2$ for $x_1$, $x_2$, $x_3$, and $x_4$; 1 for $x_5$ and $x_7$; and zero otherwise.

So $\max_v |f(v) \cap x_i| = 2$ for $x_1$, $x_2$, $x_3$, and $x_4$; 1 for $x_5$ and $x_7$; and zero otherwise.

$\max_{e \in s} |\hat{f}(e)| = 2$ for edge 3, 1 for edges 4, 5, 6, 8, 9 and 10; and zero otherwise. The value of 2 is for SRLGs $x_1$ and $x_2$.

In this example, a=b=1 and so the maximum cost is 4 (for SRLGs $x_1$ or $x_2$).

The cost for adding additional edge e=1 to the set of reporting edges for the headend g would be as follows:

$\max_a |f(a) \cap x_i| = \max|\{3,6\} \cap x_i| = 2$ for $x_2$, 1 for $x_1$ and $x_5$, and zero otherwise.

$\max_g |(f(g) \cup e) \cap x_i| = \max|\{1, 3, 4, 5, 8, 9, 10, 11\} \cap x_i| = 3$ for $x_1$, 2 for $x_2$, $x_3$, and $x_4$; 1 for $x_5$ and $x_7$; and zero otherwise.

So $\max_v |(f(g) \cup e) \cap x_i| = 3$ for $x_1$, 2 for $x_2$, $x_3$, and $x_4$; 1 for $x_5$ and $x_7$; and zero otherwise.

As before, $\max_{e \in s} |\hat{f}(e)| = 2$ for edge 3, 1 for edges 4, 5, 6, 8, 9 and 10; and zero otherwise. The value of 2 is for SRLGs $x_1$ and $x_2$.

In this example, a=b=1 and so the maximum cost is 5 (for SRLG $x_1$). Thus the incremental cost to add edge 1 to the reporting edges for headend g would be 5−4=1.

The cost for adding additional edge e=6 to the set of reporting edges for the headend g would be as follows:

$\max_a |f(a) \cap x_i| = \max|\{3,6\} \cap x_i| = 2$ for $x_2$, 1 for $x_1$ and $x_5$, and zero otherwise.

$\max_g |(f(g) \cup e) \cap x_i| = \max|\{3, 4, 5, 6, 8, 9, 10, 11\} \cap x_1| = 3$ for $x_2$, 2 for $x_1$, $x_3$, and $x_4$; 1 for $x_5$ and $x_7$; and zero otherwise.

So $\max_v |(f(g) \cup e) \cap x_i| = 3$ for $x_2$, 2 for $x_1$, $x_3$, and $x_4$; 1 for $x_5$ and $x_7$; and zero otherwise.

$\max_{e \in s} |\hat{f}(e)| = 2$ for edges 3 and 6, 1 for edges 4, 5, 8, 9 and 10; and zero otherwise. The value of 2 is for SRLGs $x_1$, $x_2$, and $x_5$.

In this example, a=b=1 and so the maximum cost is 5 (for SRLG $x_2$). Thus the incremental cost to add edge 1 to the reporting edges for headend g would be 5−4=1.

In step 650 of process 600, the component can select an edge based on the incremental benefits determined in step 630, consistent with disclosed embodiments. The component can select the edge with the greatest incremental benefit. When incremental cost are calculated in step 640 among edges having similar incremental benefits, the component can select the edge having the lowest incremental cost. Should the incremental costs be the same or similar (e.g., differing by less than a threshold amount or percentage) the component can select among the edges having similar incremental benefits randomly, or according to another criterion (e.g., the order in which the edge was considered, a position in the edge in the graph, or the like).

In this example given above, the incremental costs to add edges 1 and 6 to the reporting set for headend g are equal. Consistent with disclosed embodiments, the component may therefore select among edges 1 and 6 randomly, or based on another criterion as described above.

The disclosed embodiments are not limited to embodiments in which the component selects among edges having similar incremental benefits based on the incremental costs of the edges. In some embodiments, the component can randomly select among the edges, or select an edge based on another criterion (e.g., the order in which the edge was considered, a position of the edge in the graph, or the like).

In step 660 of process 600, the component can determine whether the SRLGs affecting the selected headend are distinguishable, consistent with disclosed embodiments. In some embodiments, when the set of indistinguishable SRLGs for each SRLG affecting a headend includes only that SRLG, the SRLGs affecting the selected headend are distinguishable. For example, when edge 1 or the edge 6 is added to the set of reporting edges r for headend g, r can become {1, 3, 4, 5, 8, 9, 10, 11} or {3, 4, 5, 6, 8, 9, 10, 11}. In either case, the sets of indistinguishable SRLGs for each SRLG affecting headend g are as follows:

$I(g,r,x_1) = \{x_1\}$ $I(g,r,x_2) = \{x_2\}$ $I(g,r,x_3) = \{x_3\}$ $I(g,r,x_4) = \{x_4\}$ $I(g,r,x_7) = \{x_7\}$

Thus updated set of reporting edges r is sufficient to distinguish the SRLGs affecting headend g.

Process 600 can proceed to step 670 when the SRLGs affecting the selected headend are distinguishable. Consistent with disclosed embodiments, an SRLG-distinguishing assignment for the graph can specify for the headend g the updated reporting edges r. Otherwise, process 600 can return to step 630. The component can then re-determine incremental benefits for the remaining edges. As may be appreciated, the incremental benefits calculated for an edge in this iteration may differ from the incremental benefits calculated for the same edge in an earlier iteration. Likewise, the incremental costs calculated for an edge may also differ from the incremental costs calculated for the edge in an earlier iteration.

In step 670 of process 600, the component can determine whether each headend has been assigned reporting edges sufficient to distinguish all SRLGs affecting that headend, consistent with disclosed embodiments. If not, process 600 can return to step 610 and another headend can be selected. Otherwise, process 600 can proceed to step 699. As may be appreciated, an SRLG-distinguishing assignment for the graph can specify for each headend reporting edges sufficient to distinguish SRLGs affecting the headend.

In step 699, process 600 can finish. Consistent with disclosed embodiments, the SRLG-distinguishing assignment generated by performance of process 600 can be stored or provided to another computing system. In some embodiments, when process 600 is performed as part of another process, the SRLG-distinguishing assignment can be used as an input to another step of that process. For example, when process 600 is performed as step 405 of process 400, the SRLG-distinguishing assignment can be used as an input to step 407 of process 400.

Figure 7:
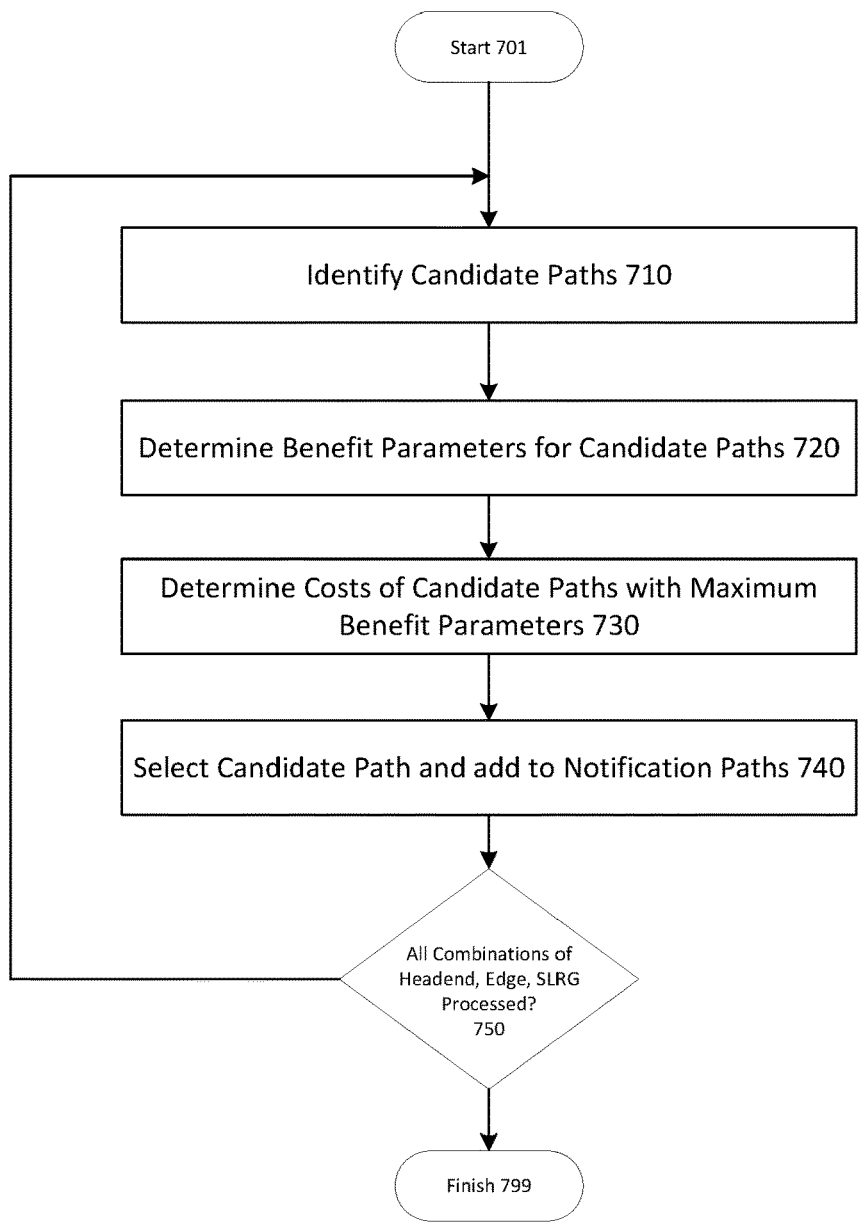
FIG. 7 depicts an exemplary process for selecting notification paths for edges in a reporting set of edges, consistent with disclosed embodiments.

FIG. 7 depicts an exemplary process 700 for generating a notification path assignment, consistent with disclosed embodiments. Inputs to process 700 can include a graph, an SRLG-distinguishing assignment for the graph (e.g., an SRLG-distinguishing assignment generated by process 600, or the like), and a set SRLG of n shared risk link groups. The set SRLG can be defined as SRLG=$\{g_1, \ldots, g_n\}$, where $g_i \in 2^E$. In some embodiments, inputs to process 700 can include a benefit value function (or parameters thereof) or a cost value function (or parameters thereof). Outputs of process 700 can include a notification path assignment that specifies, for each headend and reporting edge in the SRLG-distinguishing assignment, a set of paths on the graph between an endpoint of the edge and the headend. The set of notification paths can be resilient, such that for any SRLG affecting the edge, a path exists in the set of notification paths that is edge-disjoint to the SRLG.

Consistent with disclosed embodiments, process 700 can include selecting a combination of headend, reporting edge, and SRLG affecting the reporting edge. Candidate paths can be identified for this combination. One of the candidate paths can be selected based on a benefit value. In some embodiments, cost values can be used to select among multiple candidate paths having similar benefit values. In some embodiments, the component can randomly select among the multiple candidate paths, or select a candidate path based on another criterion.

In some embodiments, process 700 can be performed as part of process 400, described above with regards to FIG. 4. For example, process 700 can be performed to obtain a notification path assignment in step 407 of process 400. However, process 700 need not be performed as a step in process 400. Instead, process 700 can be performed as a stand-alone process or as a step in a different process of configuring a communication network.

For convenience of explanation, process 700 is described herein as being performed by a component of a communication system (e.g., communication system 100, or the like), such as a network management system (e.g., network management system 150, or the like). However, process 700 need not be performed by a network management system. Instead, process 700 can be performed by another component of a communication system, such as a node of a communication network (e.g., one of nodes 120, or the like). In some embodiments, process 700 can be performed by another computing system that obtains any necessary information for generating the notification path assignment from a network management system of a communication system.

For convenience of explanation, process 700 is described herein with reference to graph 301, depicted in FIG. 3. In this example, the SRLG-distinguishing assignment $f(v)$ can specify that headend g has reporting edge set $f(g)=\{1, 3, 4, 5, 8, 9, 10, 11\}$ and headend a has reporting edge set $f(a)=\{3,6\}$. Such an assignment can arise when g is the headend for demands $\{d_1, d_2, d_3\}$ and a is the headend for demand $\{d_4\}$.

In step 701 of process 700, a component of a communication system can start process 700, consistent with disclosed embodiments. In some embodiments, the component can obtain inputs for performing process 700. As may be appreciated, obtaining an input can include receiving or retrieving the input, or generating the input from other information. For example, a component can generate a graph of a communication network from topology information received from components of the communication network. In some embodiments, a set of notification paths can be initialized to the empty set.

In step 710 of process 700, the component can generate multiple candidate paths, consistent with disclosed embodiments. The multiple candidate paths can correspond to at least one combination of headend, edge in the SRLG-discriminating set of the headend, and affecting SRLG of the headend. In some embodiments, the component can generate multiple candidate paths for a single such combination. In some embodiments, the component can generate at least one candidate path for multiple such combinations. Consistent with disclosed embodiments, the component can select combination(s) that lack an existing notification path in the set of notification paths.

Consistent with disclosed embodiments, each candidate path for a combination including a headend and an edge can connect an endpoint of the edge with the headend. Each candidate path for a combination including an SRLG can be edge-disjoint with that SRLG. Thus each candidate path can enable an endpoint of an edge to communicate the failure of the edge to a headend, even when the selected SRLG that affects the headend has failed.

Consistent with disclosed embodiments, the component can use a suitable path-finding technique (e.g., Dijkstra's algorithm, depth-first search, breadth-first search, bidirectional search, or other suitable technique) to find each candidate path. In some embodiments, the component can attempt to find multiple candidate paths by applying multiple different path-finding techniques to the graph (or the same path-finding technique with different weights or parameters). The component can generate edge-disjoint candidate paths by temporarily removing, reweighting, or otherwise disfavoring the edges of the selected SRLG, prior to applying a path-finding technique to the graph.

In some embodiments, the component can attempt to find candidate paths that are edge-disjoint with multiple SRLGs that affect the headend. These multiple SRLGs can include the selected SRLG in the combination and additional SRLGs. The component can repeatedly attempt to find a path edge-disjoint with the multiple SRLGs. After each unsuccessful attempt, the component can discard at least one of the additional SRLGs.

In step 720 of process 700, the component can determine benefit values for each candidate path, consistent with disclosed embodiments. In some embodiments, the benefit value can depend on a number of duplicate candidate paths. The duplications can be among the candidate paths identified in step 710, or among the candidate paths identified in step 710 and the notification paths. For example, one of the candidate paths can be a duplicate of another one of the candidate paths, or a duplicate of a candidate path previously added to the set of notification paths.

Consistent with disclosed embodiments, duplications can arise when two notification paths share the same headend and endpoint. For example, two combinations can include the same headend and edge, but different SRLGs. The same notification path can be edge-disjoint with both SRLGs. As an additional example, two combinations can include the same headend but different edges that share an endpoint. Such combinations may include the same SRLG or different SRLGs. When the combinations include different SRLGs, the same notification path can be edge-disjoint with both SRLGs.

As may be appreciated, only one notification message need be sent for a set of duplicate notification paths. Thus selecting duplicate notification paths can reduce the number of notification messages transmitted and processed by the communication network, thereby improving the recovery time of the communication network.

A mapping $c(v,e,x): v \times r(v) \times a(v) \rightarrow Path(G)$ can map from a combination of headend v, edge e contained in the SRLG-discriminating set of the headend v, and affecting SRLGs x of the headend v to a path on the graph having one endpoint being the headend and the other endpoint being an endpoint of the edge. With respect to the example depicted in FIG. 3, the following combinations $c_i$ can include the headend g and have candidate paths $p_i$:

$c_1 = c(g,1,x_1) \rightarrow p_1 = \{2,5,10,11\}$ $c_2 = c(g,3,x_1) \rightarrow p_2 = \{8\}$ $c_3 = c(g,3,x_2) \rightarrow p_3 = \{8\}$ $c_4 = c(g,4,x_1) \rightarrow p_4 = \{9\}$ $c_5 = c(g,4,x_2) \rightarrow p_5 = 19)$ $c_6 = c(g,5,x_4) \rightarrow p_6 = \{7,9\}$ $c_7 = c(g,8,x_3) \rightarrow p_7 = \emptyset$, as g can be both the headend and the endpoint.

$c_8 = c(g,9,x_3) \rightarrow p_8 = \emptyset$, as g can be both the headend and the endpoint.

$c_9 = c(g,10,x_4) \rightarrow p_9 = \{7,9\}$ $c_{10} = c(g,11,x_7) \rightarrow p_9 = \emptyset$, as g can be both the headend and the endpoint.

As may be appreciated, these candidate paths are exemplary and many other suitable sets of candidate paths could be identified on graph 301, given the specified SRLG-distinguishing assignment. Similarly, in some embodiments, multiple sets of candidate paths can be generated for each combination of headend v, edge in the SRLG-discriminating set of the headend e, and affecting SRLGs.

In this example, paths $p_2$, $p_3$, $p_4$, $p_5$, $p_6$, and $p_9$ can all have a benefit value of 2 (e.g., the duplication number of each of these paths). In some embodiments, combinations that yield null paths, such as $p_7$, $p_8$, and $p_9$ can be treated as having notification paths in the set of notification paths and skipped or excluded from consideration in further iterations.

In step 730 of process 700, the component can determine incremental cost values for candidate paths, consistent with disclosed embodiments. In some embodiments, the component can only determine incremental cost values of candidate paths having the highest benefit values. In some embodiments, the component can determine incremental cost values of all candidate paths.

Consistent with disclosed embodiments, the component can determine incremental cost values according to a cost function. The cost function can depend on the number of messages (or maximum number of messages) transmitted by endpoints and the number of messages received (or maximum number of messages received) by the headends.

Consistent with disclosed embodiments, an exemplary cost function can be:

$cost(p) = \max_{x \in SRLG}(a \cdot \max_{m \in e \in r(v)} |\hat{r}(m,x)| + b \cdot \max_v |\check{p}(v) \cap s|)$ In this cost function, the function $p: v \rightarrow 2^{Path(G)}$ can be a notification path assignment between headends and sets of notification paths on the graph, where $p(v) = U_{e \in r(v), x \in a(v)} c(v,e,x)$, the union of all selected notification paths determined for a headend and all combinations of discriminating edges and affecting SRLGs for that headend. The function $\hat{p}(m,x) = \{U_{e \in r(v), x \in a(v)} c(v,e,x): v \in V, m \in endpoint(e)\}$ can be the set of selected notification paths having m as an endpoint and associated the affecting SRLG x. Thus the function $\max_{m \in e \in r(v)} |\hat{r}(m,x)|$ can be the maximum size of the set of selected notification paths for an affecting SRLG over all endpoints of all discriminating edges of a headend. The function $\check{p}(v,x) = \{U_{e \in r(v), x \in a(v)} c(v,e,x): e \in r(v)\}$ can be the set of selected notification paths having v as the headend and associated with the affecting SRLG x. The function $\max_v |\check{p}(v,x)|$ can be the maximum size of the set of selected notification paths for an affecting SRLG x over all headends.

In the cost function, the constants a and b can be weights that trade off the relative importance of minimizing the number of messages sent and minimizing the number of messages received.

With respect to the example depicted in FIG. 3, assume that the following notification paths have been selected: $\{\{2, 5, 10, 11\}, \{8\}\}$.

In this example, the only SRLG associated with the set of notification paths is $x_1$. The only headend is g. The maximum size of the set of notification paths for $x_1$ over all endpoints of all discriminating edges of g is 1, as endpoints b and d each send a single message to headend g. The maximum size of the set of selected notification paths for g and associated with $x_1$ is 2, as two notification paths associated with $x_1$ end in g. In this example, a=b=1 and the total cost of this partial set of notification paths is 3.

In this example, paths $p_3$, $p_4$, $p_5$, $p_6$, and $p_9$ all have the maximum benefit value (2) among the candidate paths (excluding $p_7$, $p_8$, and $p_9$, which can be treated as having notification paths in the set of notification paths). The component can therefore determine incremental costs for these paths.

Including $p_3$ in the set of notification paths does not change the set of notification paths, though it does associate the notification path $\{8\}$ with the SRLG $x_2$. The maximum size of the set of notification paths for $x_1$ and $x_2$ over all endpoints of all discriminating edges of g is 1, as endpoints b and d each send a single message to headend g for $x_1$ and endpoint d sends a single message to headend g for $x_2$. The maximum size of the set of selected notification paths associated with $x_1$ that end in g is 2, as two notification paths associated with $x_1$ end in g and one notification path associated with $x_2$ ends in g. Thus selecting $p_3$ does not increase the costs associated with the set of notification paths.

Including $p_4$ in the set of notification paths yields an updated set of notification paths $\{\{2, 5, 10, 11\}, \{8\}, \{9\}\}$. The maximum size of the set of notification paths for $x_1$ over all endpoints of all discriminating edges of g is 1, as endpoints a, d, e each send a single message to headend g. The maximum size of the set of selected notification paths associated with $x_1$ and ending in g is 3, as three notification paths associated with $x_1$ end in g. The total cost of this partial set of notification paths is 4 and the incremental cost of adding $p_4$ is 1.

Including $p_5$ in the set of notification paths yields also yields $\{\{2, 5, 10, 11\}, \{8\}, \{9\}\}$. However, the notification path $\{9\}$ is associated with the SRLG $x_2$. The maximum size of the set of notification paths for $x_1$ and $x_2$ over all endpoints of all discriminating edges of g is 1, as endpoints b and d each send a single message to headend g for $x_1$ and endpoint e sends a single message to headend g for $x_2$. The maximum size of the set of selected notification paths associated with $x_1$ and ending in g is 2, as two notification paths associated with $x_1$ end in g and one notification path associated with $x_2$ ends in g. Thus the total cost of this partial set of notification paths is 3 and the incremental cost of adding $p_5$ is 0.

Costs for the remaining candidate paths can be calculated similarly. As may be appreciated, in this example, the incremental cost associated with adding $p_4$ is 1 while the incremental costs associated with adding $p_3$, $p_5$, $p_6$, and $p_9$ are zero.

In step 740 of process 600, the component can select a candidate path and add the candidate path to the set of notification paths, consistent with disclosed embodiments. In some embodiments, the candidate path can be selected from among the candidate paths with the greatest benefit value. In various embodiments, when multiple candidate paths have benefit values similar to the greatest benefit value (e.g., differing from the greatest benefit value by less than a threshold amount or percentage), the candidate path can be selected from among these multiple candidate paths based on incremental costs associated with each of the multiple candidate paths. In some embodiments, the candidate path can be selected from among ones of these multiple candidate paths having incremental costs similar to the lowest incremental cost value (e.g., differing from the lowest incremental cost value by less than a threshold amount or percentage).

With respect to the example depicted in FIG. 3, paths $p_2$, $p_3$, $p_4$, $p_5$, $p_6$, and $p_9$ can all have a benefit value of 2 and paths $p_3$, $p_5$, $p_6$, and $p_9$ can have zero incremental cost. Thus the component can select a candidate path among paths $p_3$, $p_5$, $p_6$, and $p_9$ and add the selected candidate path to the set of notification paths. When multiple such paths exist, the component can select among them randomly, or according to a criterion. As described above, the set of notification paths may already include the selected candidate path. In such instances, in some embodiments, inclusion of the selected path can include associating the stored path in the set of notification paths with the affecting SRLG of the selected candidate path. Maintaining such an association can ensure proper calculation of the $\breve{p}(v,x)$ term in the cost function. As may be appreciated, the disclosed embodiments are not limited to embodiments requiring such an association, as other cost functions may not require maintenance of such an association.

In step 750 of process 700, the component can determine whether a notification path exists for every combination of headend, edge in the SRLG-discriminating edge set for the headend, and SRLG in the set of affecting SRLGs for the headend. If so, then process 700 can proceed to step 799. If not, then process 700 can return to step 710 for another iteration of process 700.

In some embodiments, the component may recalculate candidate paths (e.g., in step 710) in each iteration of process 700. In various embodiments, the component may calculate the candidate paths once, and then reuse the paths. In each iteration, the component can remove any candidate paths associated with a combination of headend, edge, and SRLG no longer lacking a corresponding notification path in the set of notification paths. In some embodiments, the component may recalculate benefit values for the candidate paths in each iteration of process 700. In various embodiments, the component may recalculate incremental costs in each iteration of process 700. As may be appreciated, the component may then select the next candidate path for inclusion in the set of notification paths based on the updated benefit values and incremental costs.

In step 799, process 700 can finish. Consistent with disclosed embodiments, the notification path assignment generated by performance of process 700 can be stored or provided to another computing system. In some embodiments, when process 700 is performed as part of another process, the notification path assignment can be used as an input to another step of that process. For example, when process 700 is performed as step 407 of process 400, the notification path assignment can be used when configuring the communication network in step 409 of process 400.

Figure 8:
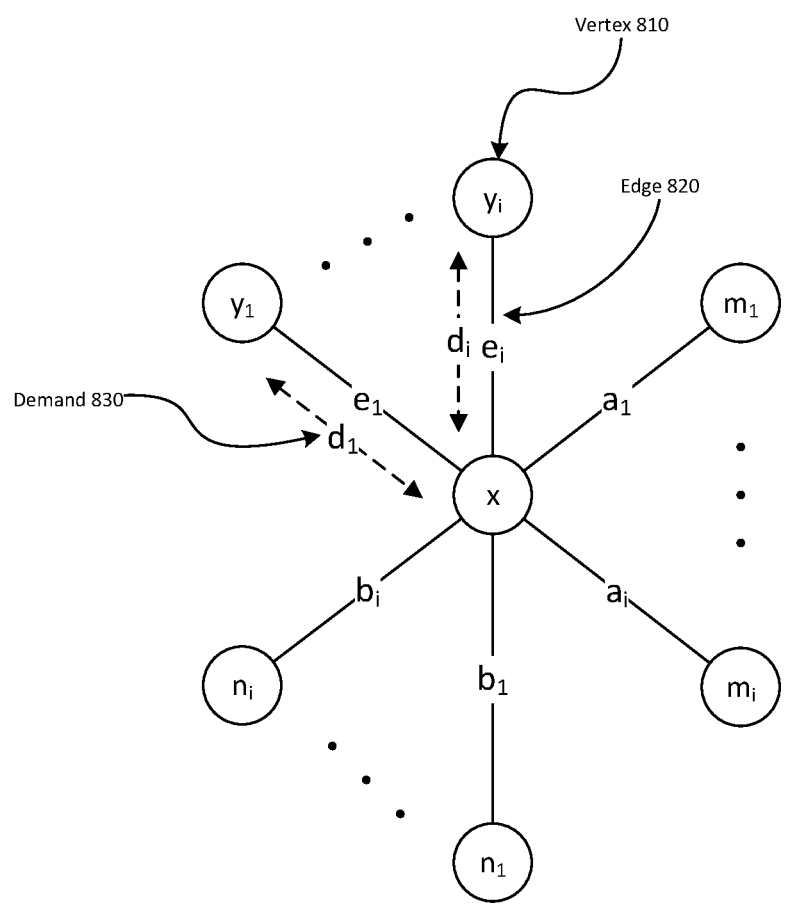
FIG. 8 depicts an exemplary communication network, consistent with disclosed embodiments.

FIG. 8 depicts a graph 800 representing an exemplary communication network. Processes for determining SRLG-discriminating edge sets consistent with disclosed embodiments can generate predictable results when applied to this graph. In this manner, this graph can be used to determine whether a method of determining SRLG-discriminating edge sets is the same or equivalent to the disclosed embodiments.

Graph 800 can include vertices (e.g., vertex 810) in four sets of vertices: central vertex x, vertices $y_1$ to $y_i$, vertices $m_1$ to $m_i$, and vertices $n_1$ to $n_i$. Each of vertices $y_1$ to $y_i$, vertices $m_1$ to $m_i$, and vertices $n_1$ to $n_i$ can be connected by a single edge (e.g., edge 820) to central vertex x. The graph can include no other edges. A set of demands $d_1$ to $d_i$ (e.g., demand 830) can be imposed on graph 800, with demand $d_j$ having an endpoint on central vertex x and another endpoint on vertex $y_j$, for j=1 to i. For every demand, the main path can be along the sole edge connecting central vertex x to the other endpoint of the demand. A set of 4i SRLGs can be associated with graph 800. These SRLGs can be in four classes:

The first class can be SRLGs $S_j^1 = \{y_j\}$ for j=1 to i.

The second class can be SRLGs $S_j^2 = \{y_j\} \cup \{m_1, \ldots, m_i\} \cup \{n_1, \ldots, n_i\}$ for j=1 to i.

The third class can be SRLGs $S_j^3 = \{y_j\} \cup \{m_1, \ldots, m_i\}$ for j=1 to i.

The fourth class can be SRLGs $S_j^4 = \{y_j\} \cup \{n_1, \ldots, n_i\}$ for j=1 to i.

For a first headend assignment, each of vertices $y_1$ to $y_i$ can be a headend of a respective demand. The cost function can be:

$$\text{cost}(f) = \max_{e \in E} |\hat{f}(e)| = \max_{e \in E} |\{v \in V : e \in f(v)\}|.$$

Then the SRLG distinguishing sets can be, for any permutation $\sigma_A: [n] \to [n]$, $\sigma_B: [n] \to [n]$, $f(Y_i) = \{e_i, a_{\sigma_A(i)}, b_{\sigma_B(i)}\}$ with $\text{cost}(f) = 1$.

If $S_j^1 = \{y_j\}$ fails, then et reports.

If $S_j^2 = \{y_j\} \cup \{m_1, \ldots, m_i\} \cup \{n_1, \ldots, n_i\}$ fails, then $e_i$, $a_{\sigma_A(i)}$, $b_{\sigma_B(i)}$ reports.

If $S_j^3 = \{y_j\} \cup \{m_1, \ldots, m_i\}$ fails, then $e_i$, $a_{\sigma_A(i)}$ reports.

If $S_j^4 = \{y_j\} \cup \{n_1, \ldots, n_i\}$ fails, then $e_i$, $b_{\sigma_B(i)}$ reports.

Each edge reports to a single headend.

For a second headend assignment, each of central vertex x can be a headend of all the demands. The cost function can be:

$$\text{cost}(f) = \max_{\{s \in SRLG\}} \left( \max_{v \in g(D)} |f(v) \cap s| \right).$$

Then the SRLG distinguishing set can be $f(X) = \{e_1, \ldots e_i, m_j, n_k\}$ for any j, k in [1, i] with $\text{cost}(f) = 3$, as at most three edges will report for any SRLG failure.

Figure 9:
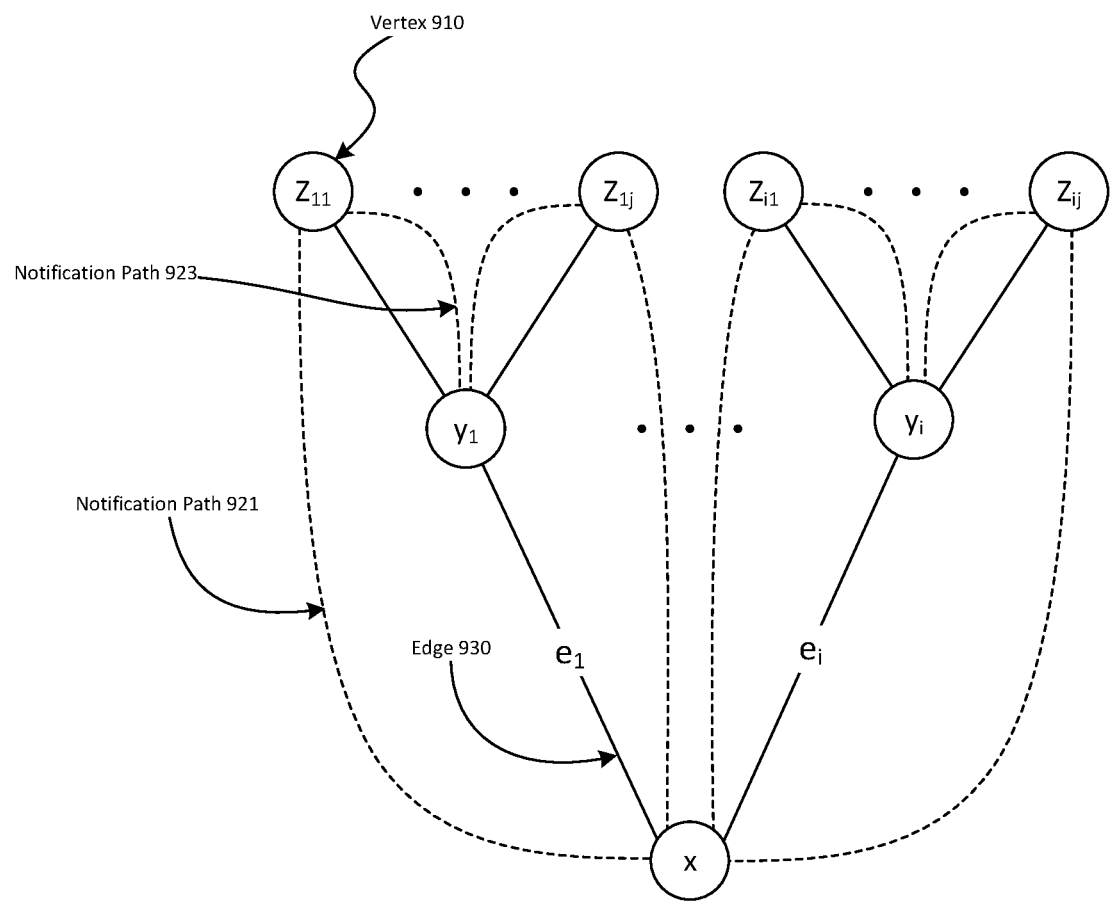
FIG. 9 depicts an exemplary communication network, consistent with disclosed embodiments.

FIG. 9 depicts a graph 900 representing an exemplary communication network. Processes for determining notification path assignments consistent with disclosed embodiments can generate predictable results when applied to this graph. In this manner, this graph can be used to determine whether a method of determining notification path assignments is the same or equivalent to the disclosed embodiments.

Graph 900 can include vertices (e.g., vertex 910) and edges (e.g., edge 930). In particular, graph 900 can include a central vertex x, a first set of vertices $y_1$ to $y_i$, and a second set of vertices $z_{11}$ to $z_{ij}$. The second set of vertices can include i disjoint subsets, each including j vertices, where j=l(i+1) for some integer 1. A set e can include i edges $\{e_1, \ldots, e_i\}$, each edge connecting the central vertex to a vertex in the first set of vertices. Each subset of vertices in the second set of vertices can correspond to one vertex in the first set of vertices. Each vertex in each subset of vertices in the second set of vertices can be directly connected by an edge to the corresponding vertex in the first set of vertices (e.g., each of vertices $z_{11}, \ldots, z_{1i}$ can be connected by an edge to $y_1$).

A set of SRLGs on graph 900 includes $s=\{e_1, \ldots, e_i\}$ and other additional SRLGs that are proper subsets of $\{e_1, \ldots, e_i\}$.

A first set of potential notification paths connects each vertex in the second set of vertices to the corresponding vertex in the first set of vertices (e.g., notification path 923 connects $z_{11}$ to $y_1$). These notification paths can be edge-disjoint with SRLG s (and thus edge-disjoint with all the SRLGs that are proper subsets of s).

A second set of potential notification paths connects each vertex in the second set of vertices to the central vertex x (e.g., notification path 921 connects $z_{11}$ to x). These notification paths can be edge-disjoint with SRLG s (and thus edge-disjoint with all the SRLGs that are proper subsets of s).

A headend assignment can be imposed on the graph. The headend assignment can specify that the headends are vertices $z_{11}$ to $z_{ij}$. The SRLG s can be an affecting SRLG for all headends. The SRLG-distinguishing assignment can specify that each edge in $\{e_1, \ldots, e_i\}$ is a reporting edge for each headend. A cost function can seek to minimize the maximum number of messages sent by a single vertex.

Consistent with the disclosed systems and methods, the notification paths can be identified such that, for every $m \in \{1, \ldots, i\}$, the central vertex x uses l notification paths connected to headends selected from the set $\{z_{m1}, \ldots, z_{mj}\}$, for a total of i·l messages, and the vertex $y_m$ uses l notification paths connected to the remaining headends in the set $\{z_{m1}, \ldots, z_{mj}\}$, for a total of i·l messages. Thus the maximum number of messages sent by a single vertex is i·l.

Figure 10:
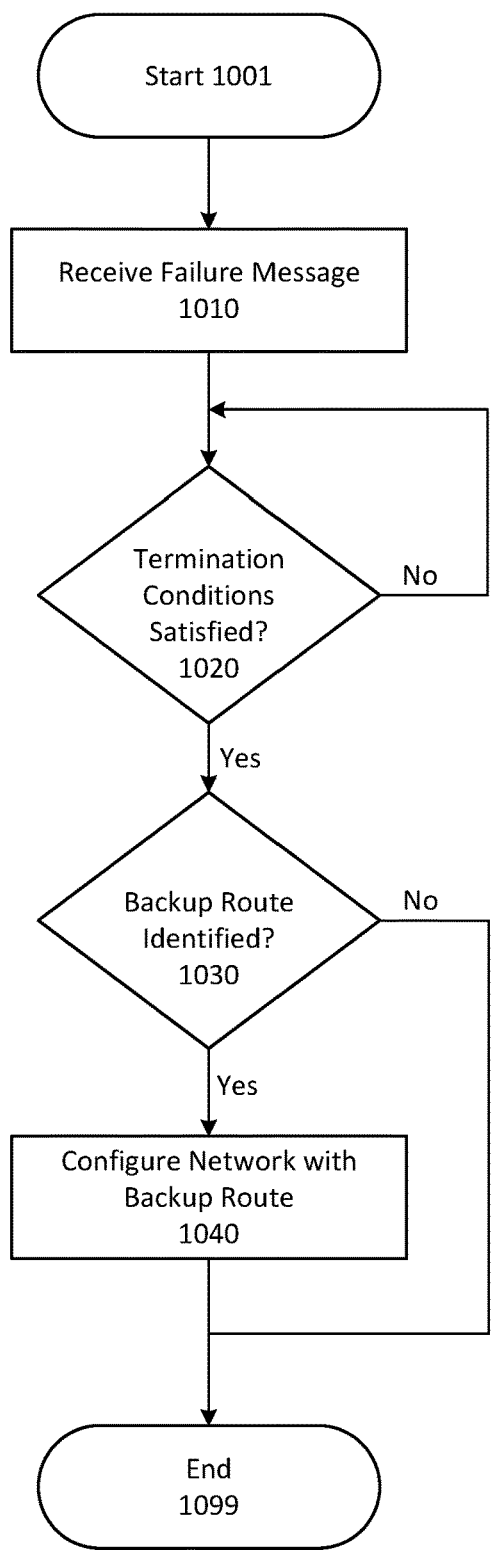
FIG. 10 depicts an exemplary process for recovering from an SRLG failure, consistent with disclosed embodiments.

FIG. 10 depicts an exemplary process 1000 for recovering from an SRLG failure, consistent with disclosed embodiments. Process 1000 can be performed in response to an SRLG failure in a network (e.g., communications network 160, or the like). Process 1000 can be performed by a component of a communication system (e.g., communication system 100, or the like). For convenience of explanation, process 1000 is described herein as being performed by a headend (e.g., one of nodes 120, or the like). However, in various embodiments, process 1000 can be performed by a network management system (e.g., network management system 150, or the like) or another component of the communication system (or another system).

In step 1001, method 1000 can begin. Process 1000 can be performed on a network configured according to a preplan assignment (e.g., a preplan assignment generated according to method 400, or the like). In some embodiments, the preplan assignment can include a headend assignment, SRLG-distinguishing assignment, and notification path assignment.

In some embodiments, the preplan assignment can include multiple layers. Consistent with disclosed embodiments, the network can be configured to use this preplan assignment to recover from multiple sequential SRLG failures. When implementing such a preplan assignment, process 1000 may include an additional step (not depicted in FIG. 10) of obtaining an updated network topology. In some embodiments, a network management system can obtain the updated network topology. The network management system can then provide instructions to network nodes to implement the appropriate layer and preplan assignment. In various embodiments, a network node can obtain an updated network topology. For example, a headend can determine the updated topology of the network based on received notification messages. The headend could then determine the appropriate layer and preplan assignment.

Consistent with disclosed embodiments, a preplan assignment of a second, third, or subsequent layer of a multi-layer preplan assignment can include an SRLG-distinguishing assignment for a modified set of SRLGs. The modified set of SRLGs can be generated by removing any failed SRLGs from the original set of SRLGs, removing the edges in any failed SRLGs from the remaining SRLGs, and deduplicating the remaining SRLGs. For example, with regards to graph 301 of FIG. 3 and assuming the failure of $x_2$, the remaining SRLGs would be $\{x_1, x_3, x_4, x_5, x_6, x_7\}$ with edges as follows:

$x_1=\{1\}$ $x_3=\{8,9\}$ $x_4=\{5,10\}$ $x_5=\{1\}$ $x_6=\{2,7\}$ $x_7=\{11\}$

After deduplication by removal of $x_5$, the modified set of SRLGs can be $\{x_1, x_3, x_4, x_6, x_7\}$. The preplan assignment corresponding to the failure of $x_2$ can include an SRLG-distinguishing assignment generated using this modified set of SRLGs. The preplan assignment corresponding to the failure of $x_2$ can further include a notification assignment generated using this SRLG-distinguishing assignment and the updated network topology (e.g., the original network topology minus the edges included in $x_2$).

Consistent with disclosed embodiments, network nodes can be configured according to the preplan (or the preplan corresponding to the current topology when the preplan includes multiple layers). In some embodiments, a node of the network can be configured as a headend for a demand according to the preplan assignment. The node can be configured with backup route(s) for the demand. In some embodiments, each backup route can correspond to an SLRG failure. With reference to graph 301, depicted in FIG. 3, headend g can be configured with a first backup route for demand $d_2$ that corresponds to the failure of $x_1=\{1, 3, 4\}$, a second backup route for demand $d_2$ that corresponds to the failure of $x_2=\{3, 4, 6\}$, and a third backup route that corresponds to the failure of $x_9=\{8, 9\}$. In some instances, a backup route can correspond to multiple SLRG failures. For example, headend g can be configured with a single backup route (e.g., $\{11, 10, 5, 2\}$) for demand $d_2$ that corresponds to each of SRLGs $x_1$, $x_2$, and $x_3$. As may be appreciated, a headend can be configured to provide decentralized routing management for multiple demands on a network. Such a headend can be configured with one or more backup routes for each of these demands. In some embodiments, for a particular demand, no backup route may be possible. In such instances, a headend associated with that demand may lack a corresponding backup route.

In step 1010 of process 1000, a headend can receive a notification message concerning an edge in the reporting edge set for the headend. As described herein, such a notification message can be received from an endpoint node that is an endpoint of the edge. The notification message can indicate the failure of the edge. As may be appreciated, the endpoint node may provide multiple messages through differing notification paths, in accordance with the notification assignment. Thus the received notification message may be the first notification message received by the headend, but not necessarily the first notification message sent by the endpoint node. Furthermore, the headend may subsequently receive additional notification messages concerning the same edge through other notification paths.

In step 1020 of process 1000, the headend can determine whether a termination condition for identifying the failed SRLG has been satisfied. In some embodiments, process 1000 can remain at step 1020 until the termination condition is satisfied. Process 1000 can then move to step 1030.

In some instances, the termination condition can include a message condition. Satisfaction of the message condition can satisfy the termination condition. The message condition can be satisfied by receipt of notification messages concerning a set of edges sufficient to uniquely identify an SRLG as being the failed SRLG. For example, with regards to the SRLG-distinguishing set $r=\{1, 3, 4, 5, 8, 9, 10, 11\}$ described above with regards to FIG. 6, receipt of notification messages concerning edges 8 and 9 may be sufficient to identify $x_3$ as the failed SRLG. A message condition for SRLG $x_3$ may therefore be satisfied by receipt of these notification messages. In contrast, receipt of notification messages concerning edges 3 and 4 may be insufficient to distinguish between SRLGs $x_1$ and $x_2$. Accordingly, message conditions for SRLGs $x_1$ and $x_2$ may not be satisfied by receipt of these notification messages. In some embodiments, receipt of a message concerning a single edge (e.g., edge 11) may be sufficient to satisfy a message condition.

In some instances, the termination condition can include a time condition. Satisfaction of the time condition can satisfy the termination condition. The time condition can be satisfied when sufficient time has elapsed. The elapsed time can be measured from a receipt time of the notification message, or another time (e.g., a failure time or estimated failure time provided in the notification message). For example, the time condition may specify that the headend will process notification messages for 500 ms following receipt of the first notification message. As may be appreciated, in some embodiments the decision timer may be incremented or reset when a notification message is received. In some such embodiments, the decision timer may only be incremented or reset when the notification message concerns a new edge (e.g., an edge for which a notification message has not previously been received).

In various embodiments, a termination condition can include message condition(s) and a time condition. The message conditions can correspond to each SRLG affecting the headend. Satisfaction of the time condition or any message condition can satisfy the termination condition.

In step 1030 of process 1000, the headend can determine whether a backup route can be identified. When such a backup route can be identified, the method can proceed to step 1040. Otherwise the method can terminate at step 1099.

Consistent with disclosed embodiments, the determination can be based on the notification messages received by the headend. In some instances, the notification messages can uniquely identify an SRLG as the failed SRLG. In various instances, the notification messages may not be sufficient to uniquely identify an SRLG. In some such instances, the received messages can be consistent with the failure of a first SRLG, but insufficient to exclude another SRLG. For example, a first SRLG can include edges $\{a, b\}$ and a second SRLG can include edges $\{a, b, c\}$. Should the first SRLG fail, the headend will only receive notification messages concerning edges a and b. Receipt of such messages cannot exclude the possibility that the second SRLG failed. Thus the termination condition will remain unsatisfied until the time condition is satisfied. In some embodiments, once the time condition is satisfied, the headend may proceed based on the assumption that the first SRLG failed.

In some embodiments, the headend can store the relationship between failed SRLGs and backup routes for a demand in a table. The table can include one or more columns indicating the failed SRLG and one or more columns indicating a backup route. For example, a column can store an indication of the failed SRLG and another column can store an indication of the backup route. In some embodiments, each row in the table can correspond to a backup route. In some embodiments, each row in the table can correspond to an SRLG failure. In some embodiments, the identified SRLG failure can be used to lookup the corresponding backup route.

As described herein, in some embodiments the preplan assignment can be used to recover from multiple SRLG failures. In such embodiments, the headend can store the relationship between the topology of the network and backup routes for a demand in a table. The table can include one or more columns indicating the topology of the network and one or more columns indicating an associated backup route. In some embodiments, the topology of the network can be indicated by indications of failed SRLGs or combinations of failed SRLGs. In some embodiments, each row in the table can correspond to a backup route. In some embodiments, each row in the table can correspond to a network topology.

As may be appreciated, an SRLG failure may affect multiple demands. In such an instance, the headend may identify multiple backup routes, each corresponding to one of the multiple demands.

In step 1040 of process 1000, the network can be configured to implement the backup route. In some embodiments, the headend can provide instructions to other nodes. The instructions can configure the other nodes to use the backup route to satisfy the demand. For example, the instructions can configure each of the other nodes to reserve communications capacity (e.g., bandwidth) for servicing the demand. As an additional example, the instructions can configure each of the other nodes with appropriate routing and wavelength assignments for servicing the demand using the backup route.

Process 1000 can terminate in step 1099. In some instances, when no backup route can be identified, the headend can provide a failure message to another component of the communication system (e.g., network management device 150, or the like). The failure message can indicate a failure to determine a suitable backup route. In some embodiments, in response to such a message, the component may generate another preplan assignment based on the current status of the network.

In some embodiments, when using a preplan assignment to recover from multiple SRLG failures, instructions can be provided to network nodes to implement a preplan corresponding to the identified SRLG failure. In some embodiments, such instructions can specify new SRLG-distinguishing assignments or new notification assignments. In various embodiments, such instructions can additionally specify new headend assignments. Consistent with disclosed embodiments, such instructions can be provided by a network management system (e.g., network management system 150), or another component of the communication system.

In exemplary embodiments, a non-transitory computer-readable storage medium including instructions is also provided, and the instructions may be executed by a device (such as a computer), for performing the above-described methods. For example, the non-transitory computer-readable storage medium may be a read-only memory (ROM), a Random-Access Memory (RAM), an electrically erasable programmable read-only memory (EEPROM), Programmable Array Logic (PAL), a disk, an optical disc, a Digital Versatile Disc (DVD), and so on.

In the preceding disclosure, various example embodiments have been described with reference to the accompanying drawings. It will, however, be evident that various modifications and changes may be made thereto, and additional embodiments may be implemented, without departing from the broader scope of the disclosure as set forth in the claims that follow. The disclosure and drawings are accordingly to be regarded in an illustrative rather than restrictive sense.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure. Therefore, it is intended that the disclosed embodiments and examples be considered as examples only, with a true scope of the present disclosure being indicated by the following claims and their equivalents.

The embodiments may further be described using the following clauses:

1. A method for configuring a communication network, comprising: obtaining a graph representing a communication network, wherein: the graph includes vertices corresponding to nodes in the communication network and edges corresponding to communication channels in the communication network, and the graph is associated with SRLGs, each edge being associated with at least one of the SRLGs, and demands, each one of the demands specifying a source vertex and a target vertex; generating a preplan assignment, generation comprising: obtaining a headend assignment between each one of the demands and a headend, the headend being one of the source vertex or the target vertex for the one of the demands, and obtaining a SRLG-distinguishing assignment between each one of the headends and a corresponding reporting edge set, the corresponding reporting edge set being sufficient to distinguish among SRLGs affecting the one of the headends; and providing instructions to configure the communication network according to the preplan assignment.

2. The method of clause 1, wherein the obtaining of the headend assignment comprises: creating headend assignment sets, each headend assignment set corresponding to a potential headend and including: each one of the demands that specifies the potential headend as being either the source vertex or the target vertex for the one of the demands; selecting ones of the headend assignment sets according to a cost function, a union of the selected ones of the headend assignment sets including the demands.

3. The method of clause 2, wherein the selected headend assignment sets are selected using a greedy selection algorithm.

4. The method of clause 2, wherein the selected headend assignment sets are selected using integer linear programming.

5. The method of any one of clauses 1 to 4, wherein obtaining the SRLG-distinguishing assignment for a first headend comprises: initializing a corresponding first reporting edge set for the first headend to include each edge on each main path of each demand assigned to the first headend.

6. The method of any one of clauses 1 to 5, wherein obtaining the SRLG-distinguishing assignment for a first headend comprises iteratively adding to a corresponding first reporting edge set for the first headend, each iteration including: selecting one of the edges based in part on an incremental benefit for the selected edge; and adding the selected edge to the first reporting edge set.

7. The method of clause 6, wherein: the incremental benefit for the selected edge depends on differences between, for each SRLG affecting the headend: a first indistinguishable SRLG set based on the first reporting edge set; and a second indistinguishable SRLG set based on the selected edge and the first reporting edge set.

8. The method of any one of clauses 6 to 7, wherein the selected edge is selected based in part on an incremental cost.

9. The method of clause 8, wherein: the incremental cost for the selected edge depends on differences between: a first value of a cost function based on the first reporting edge set; and a second value of the cost function based on the selected edge and the first reporting edge set.

10. The method of clause 9, wherein: the first value of the cost function depends on: a number of headends associated with an edge in the first reporting edge set; or a number of edges in both: a one of first SRLGs affecting the first headend; and the first reporting edge set.

11. The method of any one of clauses 6 to 10, wherein the selected edge is selected based in part on satisfying a resilience condition.

12. The method of clause 11, wherein the resilience condition comprises, for each one of first SRLGs affecting the first headend and including the edge: existence of a path on the graph between an endpoint of the selected edge and the first headend, the path being disjoint with the one of the SRLGs affecting the first headend and including the edge.

13. The method of any one of clauses 1 to 12, wherein generating the preplan assignment further comprises: generating a notification path assignment between each one of the headends and each reporting edge in the corresponding reporting edge set for the one of the headends.

14. The method of clause 13, wherein generating the notification path assignment further comprises: generating candidate notification paths, each candidate notification path: connecting one of the headends and an endpoint of a reporting edge in the corresponding reporting edge set for the one of the headends; and edge-disjoint with an affecting SRLG for the one of the headends, the affecting SRLG including the reporting edge; selecting one of the candidate notification paths; and adding the selected candidate notification path to a set of selected notification paths.

15. The method of clause 14, wherein: generating the notification path assignment further comprises determining benefit values for the candidate notification paths; and the selected candidate notification path is selected based in part on a benefit value for the selected candidate notification path.

16. The method of clause 15, wherein: determining the benefit values for the candidate notification paths comprises: determining, among the candidate notification paths and the selected notification paths, a number of duplicate notifications paths.

17. The method of any one of clauses 15 to 16, wherein: generating the notification path assignment further comprises determining cost values for the candidate notification paths; and the selected candidate notification path is selected based in part on a cost value for the selected candidate notification path.

18. The method of clause 17, wherein: the cost value for the selected candidate notification path depends on a difference between: a first value of a cost function based on the selected notification paths; and a second value of the cost function based on the selected notification paths and the selected candidate notification path.

19. The method of clause 18, wherein: the first value of the cost function depends on: a number of the selected notification paths that originate at a non-headend endpoint in the graph; or a number of the selected notification paths associated with one of the SRLGs affecting one of the headends that terminate at the one of the headends.

20. The method of clause any one of clauses 1 to 19, wherein: configuring the communication network according to the preplan assignment comprises: configuring, according to the headend assignment, a first node in the communication network as a first headend; and configuring, according to the SRLG-distinguishing assignment, a second node in the communication network to report to the first headend a failure of a first communication link.

21. The method of clause 1, wherein: the graph comprises: four sets of vertices: central vertex x, vertices $y_1$ to $y_i$, vertices $m_1$ to $m_i$, and vertices $n_1$ to $n_i$, wherein each of the vertices $y_1$ to $y_i$, the vertices $m_1$ to $m_i$, and the vertices $n_1$ to $n_i$ is connected by a single edge to the central vertex x; a set of demands $d_1$ to $d_i$, demand $d_j$ having an endpoint on central node x and another endpoint on vertex $y_j$, the main path of demand $d_j$ being along the sole edge connecting the central vertex x to the vertex $y_j$, for j=1 to i; and a set of 4i SRLGs including: SRLGs $S_j^1=\{y_j\}$ for j=1 to i; SRLGs $S_j^2=\{y_j\}\cup\{m_1,\ldots,m_i\}\cup\{n_1,\ldots,n_i\}$ for j=1 to i; SRLGs $S_j^3\{y_j\}\cup\{m_1,\ldots,m_i\}$ for j=1 to i; and SRLGs $S_j^4=\{y_j\}\cup\{n_1,\ldots,n_i\}$ for j=1 to i; when the headend assignment associates each of the vertices $y_1$ to $y_i$ with a corresponding one of demands $d_1$ to $d_i$ and a cost function for the SRLG-distinguishing assignment is $$\text{cost}(f) = \max_{e\in E}|\hat{f}(e)| = \max_{e\in E}|\{v \in V : e \in f(v)\}|,$$

the SRLG-distinguishing assignment is, for any permutation $\sigma_A$: $[n]\to[n]$, $\theta_B$: $[n]\to[n]$, $f(y_i)=\{e_i, a_{\sigma_A(i)}, b_{\sigma_B(i)}\}$ with $\text{cost}(f)=1$; and when the headend assignment associates each of the central vertex x with all of demands $d_1$ to $d_i$ and a cost function for the SRLG-distinguishing assignment is $$\text{cost}(f) = \max_{\{s\in SRLG\}}\left(\max_{v\in g(D)}|f(v)\cap s|\right),$$

the SRLG-distinguishing assignment is $f(x)=\{e_1,\ldots e_i, m_j, n_k\}$ for any j, k in [1, i] with $\text{cost}(f)=3$.

22. The method of clause 1, wherein: the graph comprises: a central vertex x; a first set of vertices $y_1$ to $y_i$; a second set of vertices $z_{11}$ to $z_{ij}$; and wherein: the second set of vertices can include i disjoint subsets, each including j vertices, where j=l(i+1) for some integer l; a set e can include i edges $\{e_1,\ldots,e_i\}$, each edge connecting the central vertex to a vertex in the first set of vertices; each subset of vertices in the second set of vertices can correspond to one vertex in the first set of vertices; and each vertex in each subset of vertices in the second set of vertices can be directly connected by an edge to the corresponding vertex in the first set of vertices; a set of SRLGs includes $s=\{e_1,\ldots,e_i\}$ and other additional SRLGs that are proper subsets of $\{e_1,\ldots,e_i\}$; a first set of potential notification paths, edge-disjoint with SRLG s, connects each vertex in the second set of vertices to the corresponding vertex in the first set of vertices; a second set of potential notification paths, edge-disjoint with SRLG s, connects each vertex in the second set of vertices to the central vertex x; the headend assignment specifies that the headends are vertices $z_{11}$ to $z_{ij}$; the SRLG-distinguishing assignment specifies that each edge in $\{e_1,\ldots,e_i\}$ is a reporting edge for each headend; a cost function for the notification path assignment depends upon the maximum number of messages sent by a single vertex; and the notification path assignment specifies that, for every $m\in\{1,\ldots,i\}$, the central vertex x uses l notification paths connected to headends selected from the set $\{z_{m1},\ldots,z_{mj}\}$, for a total of i·l messages, and the vertex $y_m$ uses notification paths connected to the remaining headends in the set $\{z_{m1},\ldots,z_{mj}\}$, for a total of i·l messages, the maximum number of messages sent by a single vertex being i·l.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

What is claimed is:

1. A method for configuring a communication network, comprising:
obtaining a graph representing a communication network, wherein:
the graph includes vertices corresponding to nodes in the communication network and edges corresponding to communication channels in the communication network, and
the graph is associated with SRLGs, each edge being associated with at least one of the SRLGs, and demands, each one of the demands specifying a source vertex and a target vertex;

generating a preplan assignment, generation comprising:
  obtaining a headend assignment between each one of the demands and a headend, the headend being one of the source vertex or the target vertex for the one of the demands, and
  obtaining a SRLG-distinguishing assignment between each one of the headends and a corresponding reporting edge set, the corresponding reporting edge set being sufficient to distinguish among SRLGs affecting the one of the headends; and
providing instructions to configure the communication network according to the preplan assignment.

2. The method of claim 1, wherein the obtaining of the headend assignment comprises:
  creating headend assignment sets, each headend assignment set corresponding to a potential headend and including:
    each one of the demands that specifies the potential headend as being either the source vertex or the target vertex for the one of the demands;
  selecting ones of the headend assignment sets according to a cost function, a union of the selected ones of the headend assignment sets including the demands.

3. The method of claim 2, wherein the selected headend assignment sets are selected using a greedy selection algorithm.

4. The method of claim 2, wherein the selected headend assignment sets are selected using integer linear programming.

5. The method of claim 1, wherein obtaining the SRLG-distinguishing assignment for a first headend comprises:
  initializing a corresponding first reporting edge set for the first headend to include each edge on each main path of each demand assigned to the first headend.

6. The method of claim 1, wherein obtaining the SRLG-distinguishing assignment for a first headend comprises iteratively adding to a corresponding first reporting edge set for the first headend, each iteration including:
  selecting one of the edges based in part on an incremental benefit for the selected edge; and
  adding the selected edge to the first reporting edge set.

7. The method of claim 6, wherein:
  the incremental benefit for the selected edge depends on differences between, for each SRLG affecting the headend:
    a first indistinguishable SRLG set based on the first reporting edge set; and
    a second indistinguishable SRLG set based on the selected edge and the first reporting edge set.

8. The method of claim 6, wherein the selected edge is selected based in part on an incremental cost.

9. The method of claim 8, wherein:
  the incremental cost for the selected edge depends on differences between:
    a first value of a cost function based on the first reporting edge set; and
    a second value of the cost function based on the selected edge and the first reporting edge set.

10. The method of claim 9, wherein:
  the first value of the cost function depends on:
    a number of headends associated with an edge in the first reporting edge set; or
    a number of edges in both:
      a one of first SRLGs affecting the first headend; and
      the first reporting edge set.

11. The method of claim 6, wherein the selected edge is selected based in part on satisfying a resilience condition.

12. The method of claim 11, wherein the resilience condition comprises, for each one of first SRLGs affecting the first headend and including the edge:
  existence of a path on the graph between an endpoint of the selected edge and the first headend, the path being disjoint with the one of the SRLGs affecting the first headend and including the edge.

13. The method of claim 1, wherein generating the preplan assignment further comprises:
  generating a notification path assignment between each one of the headends and each reporting edge in the corresponding reporting edge set for the one of the headends.

14. The method of claim 13, wherein generating the notification path assignment further comprises:
  generating candidate notification paths, each candidate notification path:
    connecting one of the headends and an endpoint of a reporting edge in the corresponding reporting edge set for the one of the headends; and
    edge-disjoint with an affecting SRLG for the one of the headends, the affecting SRLG including the reporting edge;
  selecting one of the candidate notification paths; and
  adding the selected candidate notification path to a set of selected notification paths.

15. The method of claim 14, wherein:
  generating the notification path assignment further comprises determining benefit values for the candidate notification paths; and
  the selected candidate notification path is selected based in part on a benefit value for the selected candidate notification path.

16. The method of claim 15, wherein:
  determining the benefit values for the candidate notification paths comprises:
    determining, among the candidate notification paths and the selected notification paths, a number of duplicate notifications paths.

17. The method of claim 15, wherein:
  generating the notification path assignment further comprises determining cost values for the candidate notification paths; and
  the selected candidate notification path is selected based in part on a cost value for the selected candidate notification path.

18. The method of claim 17, wherein:
  the cost value for the selected candidate notification path depends on a difference between:
    a first value of a cost function based on the selected notification paths; and
    a second value of the cost function based on the selected notification paths and the selected candidate notification path.

19. The method of claim 18, wherein:
  the first value of the cost function depends on:
    a number of the selected notification paths that originate at a non-headend endpoint in the graph; or
    a number of the selected notification paths associated with one of the SRLGs affecting one of the headends that terminate at the one of the headends.

20. The method of claim 1, wherein:
  configuring the communication network according to the preplan assignment comprises:
    configuring, according to the headend assignment, a first node in the communication network as a first headend; and configuring, according to the SRLG-distinguishing assignment, a second node in the communication network to report to the first headend a failure of a first communication link.

21. The method of claim 1, wherein:
the graph comprises:
   four sets of vertices: central vertex x, vertices $y_1$ to $y_i$, vertices $m_1$ to $m_i$, and vertices $n_1$ to $n_i$, wherein each of the vertices $y_1$ to $y_i$, the vertices $m_1$ to $m_i$, and the vertices $n_1$ to $n_i$ is connected by a single edge to the central vertex x;
   a set of demands $d_1$ to $d_i$, demand $d_j$ having an endpoint on central node x and another endpoint on vertex $y_j$, the main path of demand $d_j$ being along the sole edge connecting the central vertex x to the vertex $y_j$, for j=1 to i; and
   a set of 4i SRLGs including:

SRLGs $S_j^1 = \{y_j\}$ for j=1 to i;

SRLGs $S_j^2 = \{y_j\} \cup \{m_1, \ldots, m_i\} \cup \{n_1, \ldots, n_i\}$ for j=1 to i;

SRLGs $S_j^3 = \{y_j\} \cup \{m_1, \ldots, m_i\}$ for j=1 to i; and

SRLGs $S_j^4 = \{y_j\} \cup \{n_1, \ldots, n_i\}$ for j=1 to i;

when the headend assignment associates each of the vertices $y_1$ to $y_i$ with a corresponding one of demands $d_1$ to $d_i$ and a cost function for the SRLG-distinguishing assignment is $$\text{cost}(f) = \max_{e \in E} |\hat{f}(e)| = \max_{e \in E} |\{v \in V : e \in f(v)\}|, \text{ the SRLG-}$$

distinguishing assignment is, for any permutation $\sigma_A : [n] \to [n]$, $\sigma_B : [n] \to [n]$, $f(y_i) = \{e_i, a_{\sigma_A(i)}, b_{\sigma_B(i)}\}$ with cost(f)=1; and when the headend assignment associates each of the central vertex x with all of demands $d_1$ to $d_i$ and a cost function for the SRLG-distinguishing assignment is $$\text{cost}(f) = \max_{\{s \in SRLG\}} \left( \max_{v \in g(D)} |f(v) \cap s| \right),$$

the SRLG-distinguishing assignment is $f(x) = \{e_1, \ldots e_i, m_j, n_k\}$ for any j, k in [1, i] with cost(f)=3.

22. The method of claim 1, wherein:
the graph comprises:
   a central vertex x;
   a first set of vertices $y_1$ to $y_i$;
   a second set of vertices $z_{11}$ to $z_{ij}$; and
wherein:
   the second set of vertices can include i disjoint subsets, each including j vertices, where j=l (i+1) for some integer l;
   a set e can include i edges $\{e_1, \ldots, e_i\}$, each edge connecting the central vertex to a vertex in the first set of vertices;
   each subset of vertices in the second set of vertices can correspond to one vertex in the first set of vertices; and
   each vertex in each subset of vertices in the second set of vertices can be directly connected by an edge to the corresponding vertex in the first set of vertices;
a set of SRLGs includes $s = \{e_1, \ldots, e_i\}$ and other additional SRLGs that are proper subsets of $\{e_1, \ldots, e_i\}$;
a first set of potential notification paths, edge-disjoint with SRLG s, connects each vertex in the second set of vertices to the corresponding vertex in the first set of vertices;
a second set of potential notification paths, edge-disjoint with SRLG s, connects each vertex in the second set of vertices to the central vertex x;
the headend assignment specifies that the headends are vertices $z_{i1}$ to $z_{ij}$;
the SRLG-distinguishing assignment specifies that each edge in $\{e_1, \ldots, e_i\}$ is a reporting edge for each headend;
a cost function for the notification path assignment depends upon the maximum number of messages sent by a single vertex; and
the notification path assignment specifies that, for every $m \in \{1, \ldots, i\}$, the central vertex x uses l notification paths connected to headends selected from the set $\{z_{m1}, \ldots, z_{mj}\}$, for a total of i·l messages, and the vertex $y_m$ uses notification paths connected to the remaining headends in the set $\{z_{m1}, \ldots, z_{mj}\}$, for a total of i·l messages, the maximum number of messages sent by a single vertex being i·l.

* * * * *